(12) United States Patent
Birand et al.

(10) Patent No.: US 8,510,381 B1
(45) Date of Patent: Aug. 13, 2013

(54) SHARING ELECTRONIC RESOURCES WITH USERS OF NEARBY DEVICES

(75) Inventors: Gulay Birand, Seattle, WA (US); Daniel George Koulomzin, Jamaica Plain, MA (US); Christopher Richard Wren, Arlington, MA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/396,472

(22) Filed: Feb. 14, 2012

(51) Int. Cl.
*G06F 15/16* (2006.01)

(52) U.S. Cl.
USPC .......................................... 709/204

(58) Field of Classification Search
None
See application file for complete search history.

(56) References Cited

U.S. PATENT DOCUMENTS

| | | | |
|---|---|---|---|
| 7,856,373 B2 | 12/2010 | Ullah | |
| 7,945,653 B2 | 5/2011 | Zuckerberg et al. | |
| 8,150,915 B1 | 4/2012 | Raman et al. | |
| 2004/0102921 A1 | 5/2004 | Tovinkere et al. | |
| 2004/0236850 A1 | 11/2004 | Krumm et al. | |
| 2006/0007315 A1 | 1/2006 | Singh | |
| 2006/0046709 A1 | 3/2006 | Krumm et al. | |
| 2006/0146765 A1* | 7/2006 | Van De Sluis et al. | 370/338 |
| 2007/0165554 A1 | 7/2007 | Jefferson et al. | |
| 2007/0167136 A1* | 7/2007 | Groth | 455/41.2 |
| 2007/0255695 A1 | 11/2007 | Hu et al. | |
| 2007/0255785 A1* | 11/2007 | Hayashi et al. | 709/204 |
| 2008/0194270 A1 | 8/2008 | Greenberg | |
| 2008/0214235 A1 | 9/2008 | Sagou et al. | |
| 2008/0278438 A1 | 11/2008 | Brown et al. | |
| 2009/0093272 A1 | 4/2009 | Saarisalo et al. | |
| 2009/0181653 A1 | 7/2009 | Alharayeri | |
| 2009/0185763 A1 | 7/2009 | Park et al. | |
| 2009/0298513 A1 | 12/2009 | Hampel et al. | |
| 2010/0103277 A1 | 4/2010 | Leebow | |
| 2010/0124906 A1* | 5/2010 | Hautala | 455/412.1 |
| 2010/0194896 A1 | 8/2010 | Heimendinger | |
| 2010/0277611 A1 | 11/2010 | Holt et al. | |
| 2010/0310134 A1 | 12/2010 | Kapoor et al. | |
| 2010/0325218 A1 | 12/2010 | Castro et al. | |
| 2011/0022529 A1 | 1/2011 | Barsoba et al. | |
| 2011/0043437 A1 | 2/2011 | Tang et al. | |
| 2011/0072015 A1 | 3/2011 | Lin et al. | |
| 2011/0207402 A1 | 8/2011 | Perkins et al. | |
| 2011/0209138 A1* | 8/2011 | Monteith et al. | 717/172 |
| 2011/0303741 A1 | 12/2011 | Bolton et al. | |
| 2012/0148037 A1 | 6/2012 | Brunson | |
| 2012/0184372 A1 | 7/2012 | Laarakkers et al. | |

(Continued)

OTHER PUBLICATIONS

Covell et al. "Waveprint: Efficient wavelet-based audio fingerprinting", Pattern Recognition, vol. 44, issue 11, Nov. 2008, 3 pgs.

(Continued)

*Primary Examiner* — Peling Shaw
(74) *Attorney, Agent, or Firm* — Shumaker & Sieffert, P.A.

(57) ABSTRACT

A device receives shared data that identifies resources shared by users of nearby devices. The device outputs a user interface that contains a private area and a public area. The public area includes one or more display elements. Each of the display elements in the public area represents one of the resources shared by one of the users of one of the nearby devices. A user of the device may move the display element that represents a given resource from the public area to the private area. When the user moves the display element to the private area, the device performs an action associated with the given resource.

18 Claims, 15 Drawing Sheets

(56) References Cited

U.S. PATENT DOCUMENTS

| | | |
|---|---|---|
| 2012/0214411 A1 | 8/2012 | Levy |
| 2012/0215617 A1 | 8/2012 | Shah et al. |
| 2012/0238248 A1 | 9/2012 | Jonsson |
| 2012/0250950 A1 | 10/2012 | Papakipos et al. |

OTHER PUBLICATIONS

Raja, "Wi-Fi Indoor Positioning System (Wi-Fi IPS)" [online]. First accessed on Oct. 11, 2011. Retrieved from the Internet: <http://sites.google.com/site/monojkumarraja/academic-projects/wi-fi-indoor-positioning-system> 4 pgs.

Kapoor et al. "Probabilistic Combination of Multiple Modalities to Detect Interest", Proceedings of the 17th International Conference on Pattern Recognition, vol. 3, Aug. 2004. Retrieved from the Internet: <http://affect.media.mit.edu/pdfs/04.kapoor-picard-ivanov.pdf> 4 pgs.

Krumm et al., "The NearMe Wireless Proximity Server", UbiComp 2004. The Sixth International Conference on Ubiquitous Computing, Sep. 7-10, 2004. Retrieved from the Internet: <http://research.microsoft.com/en-us/um/people/kenh/papers/NearMe.pdf> 18 pgs.

An, PowerPoint Presentation, "Hierarchical Mixture of Experts," Machine learning reading group, Duke University, Jul. 15, 2005, 23 pgs.

Benson et al., "Event Discovery in Social Media Feeds," Computer Science and Artificial Intelligence Laboratory, Massachusetts Institute of Technology, retrieved at http://people.csail.mit.edu/eob/papers/acl2011-twitter.pdf, 2011, 10 pgs.

Bishop et al., "Bayesian Hierarchical Mixtures of Experts," Uncertainty in Artificial Intelligence: Proceedings of the Nineteenth Conference, 2003, retrieved at http://research.microsoft.com/en-us/um/people/cmbishop/downloads/Bishop-UAI-VHME.pdf, 8 pgs.

Jacobs et al., "Adaptive Mixtures of Local Experts," Neural Computation 3, retrieved at http://www.cs.toronto.edu/~hinton/absps/jjnh91.pdf, 1991, pp. 79-87.

Jacobs, "Mixtures-of-Experts," Department of Brain & Cognitive Sciences, University of Rochester, retrieved at http://www.bcs.rochester.edu/people/robbie/jacobslab/cheat_sheet/mixture_experts.pdf, Aug. 8, 2008, 5 pgs.

Sarma et al., "Dynamic Relationship and Event Discovery," WSDM'11, retrieved from http://web.eecs.umich.edu/~congy/work/wsdm11.pdf, Feb. 9-12, 2011, Hong Kong, China, 10 pgs.

Titsias et al, "Mixture of Experts Classification Using Hierarchical Mixture Model," Department of Computer Science, University of Ioannina, Neural Computation, Apr. 2, 2002, 24 pgs.

* cited by examiner

SHARING ELECTRONIC RESOURCES WITH USERS OF NEARBY DEVICES

BACKGROUND

There may be a variety of situations where a person may want to share electronic resources with users of nearby electronic devices. For example, the person may want to share an electronic business card with people in a business meeting. In another example, the person may want to share a photograph, recorded music, or a document with other nearby people. Traditionally, the person would have to know contact information, such as email addresses or phone numbers, of the other people in order to share electronic resources with the other people. However, obtaining such contact information may be a time consuming process. Moreover, sharing an electronic resource with other people using email or text message may require the person to divulge their own contact information, which may not necessarily be desirable.

SUMMARY

This disclosure describes techniques for sharing electronic resources with users of nearby devices. A device receives shared data from a server system. The shared data identifies resources shared by users of nearby devices. In addition, the device uses the shared data to display a user interface (UI) at a display screen. The UI contains a private area and a public area. The public area includes display elements that represent the resources shared by the users of the nearby devices. The device may perform an action associated with the resource in response to receiving a capture input that moves a display element from the public area to the private area of the UI.

In one embodiment, a method comprises receiving, at a first computing device, shared data that identifies a resource currently shared by a user of a second computing device. The second computing device is currently proximate to the first computing device. The method also comprises outputting, at a display operatively coupled to the first computing device, a user interface comprising a private area and a public area, the public area including a display element that represents the resource. In addition, the method comprises receiving, at the first computing device, an input to move the display element from the public area to the private area. The method also comprises identifying, based on the shared data, an action associated with the resource. The method also comprises performing, at the first computing device, the identified action in response to receiving the input.

In another embodiment, a computing device comprises a processing system configured to read instructions from a computer readable medium and execute the instructions. Execution of the instructions causes the computing device to output, at a display operatively coupled to the computing device, a user interface that comprises a private area and a public area. The public area includes a display element that represents a resource shared by a user of a device that is currently proximate to the computing device. Execution of the instructions also causes the computing device to identify, based on a URI of the resource, an action associated with the resource. Furthermore, execution of the instructions causes the computing device to perform the identified action in response to receiving input to move the display element from the public area to the private area.

In another embodiment, a computer-readable storage medium comprises instructions for causing one or more processors of a computing device to perform operations comprising receiving shared data from a server system. The shared data identifies a first resource and a second resource shared by users of devices that are currently proximate to the computing device. The operations also include outputting, at a display operatively coupled to the first computing device, a user interface that comprises a public area and a private area. The public area includes a first display element and a second display element. The first display element represents the first resource. The second display element represents the second resource. In addition, the operations include receiving input to move the first display element from the public area to the private area. The operations also include identifying, based on the shared data, an action associated with the first resource. Furthermore, the operations include performing, in response to receiving the input to move the first display element from the public area to the private area, the action associated with the first resource. The operations also include receiving a second capture input to move the second display element from the public area to the private area. In addition, the operations include identifying, based on the shared data, an action associated with the second resource. The action associated with the second resource is different than the action associated with the first resource. The operations also include performing, in response to receiving the input to move the second display element from the public area to the private area, the action associated with the second resource.

The details of one or more embodiments of the invention are set forth in the accompanying drawings and the description below. Other features, objects, and advantages of the invention will be apparent from the description and drawings, and from the claims.

DETAILED DESCRIPTION

The attached drawings illustrate examples. Elements indicated by reference numbers in the attached drawings correspond to elements indicated by like reference numbers in the following description. In the attached drawings, stacked elements indicate the presence of one or more similar elements. Alphabetical suffixes on reference numbers for similar elements are not intended to indicate the presence of particular numbers of the elements. In this disclosure, elements having names that start with ordinal words (e.g., "first," "second," "third," and so on) do not necessarily imply that the elements have a particular order. Rather, such ordinal words are merely used to refer to different elements of a same or similar type. In this disclosure, the term "exemplary" refers to "something serving as an example, instance, or illustration," and should not necessarily be construed as preferred or advantageous over other configurations or designs.

Figure 1:
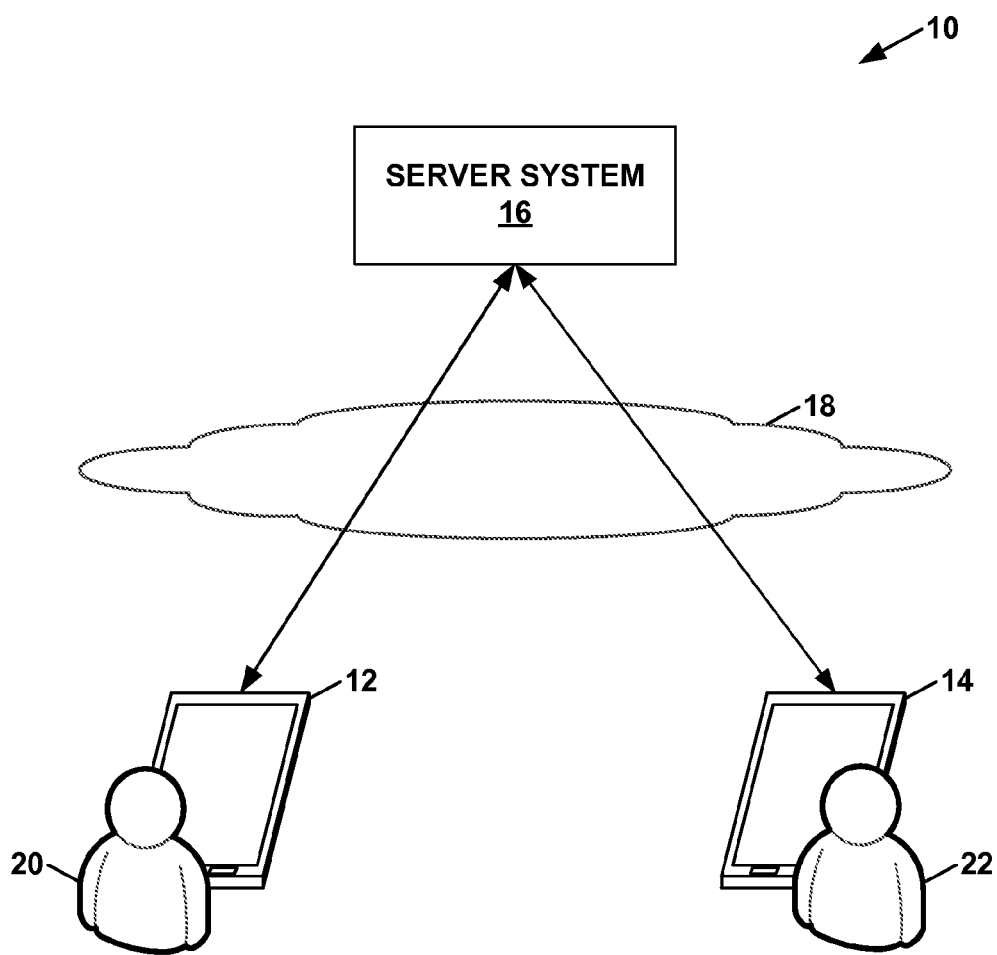
FIG. 1 is a conceptual diagram that illustrates an exemplary environment in which the techniques of this disclosure may be used.

FIG. 1 is a conceptual diagram that illustrates an example system 10 in which the techniques of this disclosure may be used. System 10 includes client computing devices 12 and 14, a server system 16, and a network 18. A user 20 uses client computing device 12. A user 22 uses client computing device 14. In other examples, system 10 may include more, fewer, or different components.

In various examples, client computing devices 12 and 14 may include various types of computing devices. In the example of FIG. 1, client computing devices 12 and 14 are shown as tablet computers. In other examples, client computing devices 12 and 14 may include other types of computing devices. For example, client computing devices 12 and/or 14 may be mobile phones, personal media players, personal digital assistants, in-car computers, personal computers, mobile phones, networked appliances, computer workstations, set-top boxes, or other types of computing devices.

Server system 16 may comprise one or more computing devices configured to provide a service. In various examples, server system 16 may comprise various types of computing devices. For example, server system 16 may comprise one or more standalone server devices, rack-mounted server devices, blade server devices, personal computers, and/or other types of computing devices.

Client computing devices 12 and 14 may communicate with server system 16 through network 18. Network 18 may comprise one or more communication links and intermediate network devices that forward messages sent by client computing devices 12, 14, and server system 16. In various examples, the communication links and intermediate network devices of network 18 may belong to various types. For example, the communication links in network 18 may include wired and/or wireless communication links. Example types of intermediate network devices may include routers, switches, bridges, firewalls, intrusion detection devices, hubs, and other types of computing devices.

User 20 and user 22 may be proximate to each other. For instance, user 20 and user 22 may be in the same room or building. In some instances, user 20 and user 22 may be sitting at the same table. User 20 may want to share an electronic resource with user 22. For example, user 20 may want to share an electronic business card with user 22. In another example, user 20 may want to share a photograph or document with user 22. For ease of explanation, this disclosure may use the term "resource" to refer to electronic resources.

Traditionally, it has been difficult for user 20 to share electronic resources with user 22 if user 20 does not have contact information for user 22. For example, it may be difficult for user 20 to share electronic resources with user 22 if user 20 does not have an email address for user 22, if wireless adapters of client computing devices 12 and 14 are not configured to accept communications from each other, or if the user 20 and user 22 are not linked to one another in a social networking system. The techniques of this disclosure may overcome such issues and may enable users 20 and 22 share electronic resources more easily.

As described in this disclosure, client computing devices 12 and 14 may send context data to server system 16 via network 18. Server system 16 may use the context data to determine devices that are proximate to one another. For instance, server system 16 may use the context data to determine whether client computing device 14 is proximate to client computing device 12.

The context data may provide information about the current locations of client computing devices 12 and 14. For example, the context data may include geo-positioning data. In another example, the context data may include information about which wireless network access points are within range of client computing devices 12 and 14 and the signal strengths of the wireless access points. In yet another example, the context data may include information about devices which with client devices 12 and 14 can communicate. In yet another example, the context data may include information about sounds or vibrations detected by client computing devices 12 and 14.

When user 20 wants to share a resource with user 22 or receive a resource shared by user 22, user 20 may instruct client computing device 12 to output a sharing interface on a display operatively coupled to client computing device 12. The sharing interface may be a user interface (UI) that includes a private area and a public area. Client computing device 14 may display a similar sharing interface when user 22 wants to share a resource with user 20 or receive a resource shared by user 20.

Initially, the private area of the sharing interface displayed by client computing device 12 may contain one or more display elements that represent resources associated with user 20. In some instances, the display elements may be referred to herein as "chiclets." For example, the private area may contain a display element that represents a song in a music library of user 20. In another example, the private area may contain a display element that represents a document or photograph stored on client computing device 12. The resources represented by the display elements in the private area are not shared with other users.

User 20 may share a given resource with users of proximate (i.e., nearby) devices by moving a display element from the private area of the sharing interface to the public area of the sharing interface. For example, user 20 may share a photograph with users of proximate devices by moving the display element that represents the photograph from the private area to the public area. When user 20 moves the display element from the private area to the public area, the display element may appear in the public areas of sharing interfaces displayed by proximate devices.

In some examples, client computing device 12 may send a share notification to server system 16 when user 20 moves the display element from the private area to the public area. The share notification may identify user 20 and the resource.

Server system 16 may then communicate with the proximate devices, e.g., client computing device 14, to instruct the proximate devices to show a display element representing the resource in the public areas of their sharing interfaces.

Client computing device 12 may communicate with server system 16 to receive shared data. The shared data may indicate which resources are shared by users of proximate devices. The shared data may be "shared" in the sense that the shared data may provide information regarding the resources shared by the users of the proximate devices. Client computing device 12 may use the shared data to generate display elements in the public area of the sharing interface. User 20 may "capture" a given resource by moving the display element that represents the given resource from the public area of the sharing interface to the private area of the sharing interface.

When user 20 captures a given resource, client computing device 12 may identify, based on the shared data, an action associated with the given resource. Client computing device 12 may then perform the identified action. For example, if the display element represents an electronic business card for user 22, client computing device 12 may add contact information from the electronic business card to an electronic address book associated with user 20. In another example, the display element may represent a social networking profile of user 22. In this example, client computing device 12 may communicate with a social networking service to establish a social networking link between user 20 and user 22. Thus, when user 20 captures a given resource, client computing device 12 may automatically perform an action that is intuitively associated with the given resource. It may not be necessary for client computing device 12 to store information regarding the person sharing the given resource or the device used by the person sharing the given resource prior to performing the action.

Figure 2:
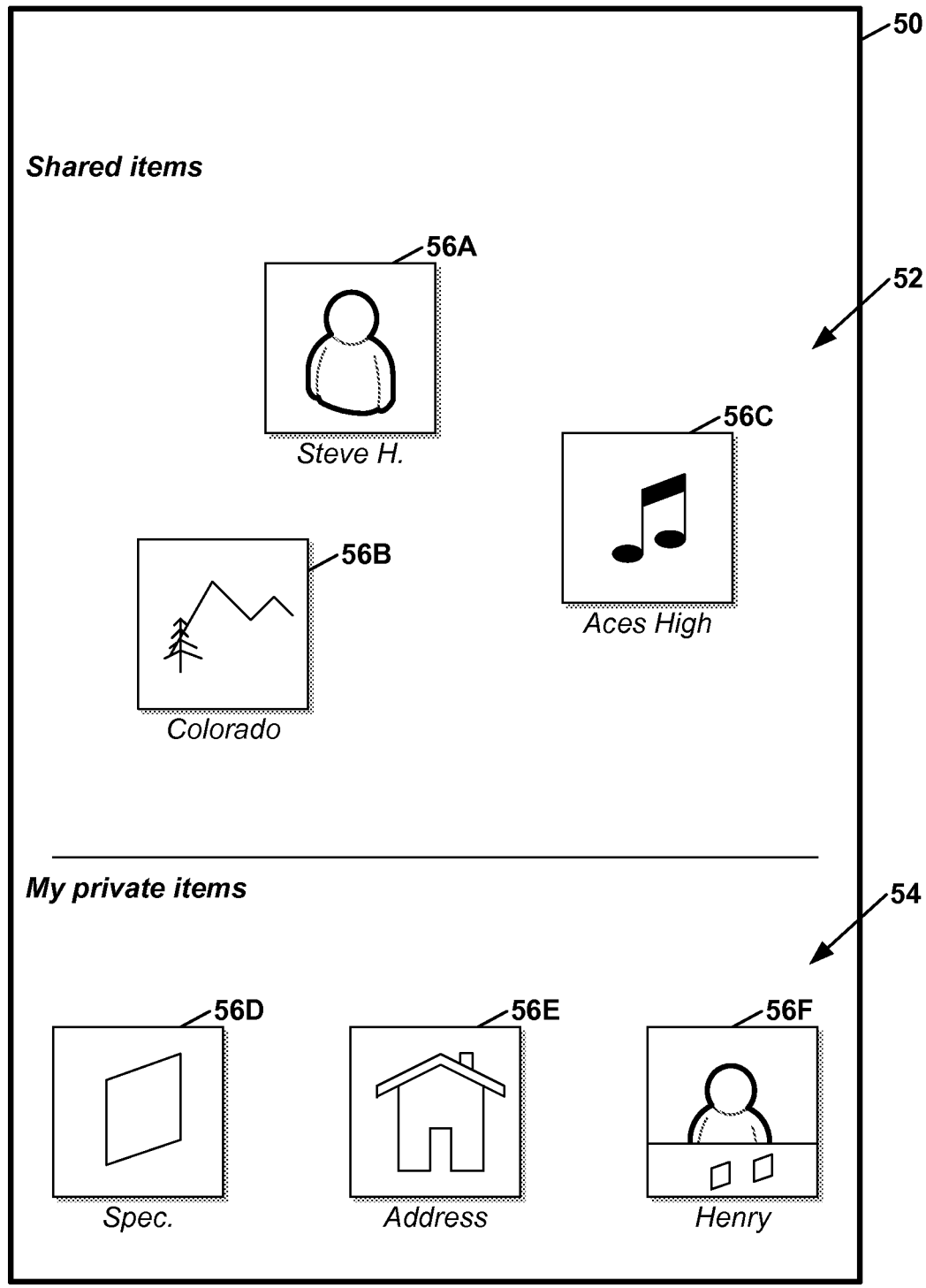
FIG. 2 illustrates an example sharing interface displayed by a client computing device.

FIG. 2 is a screen diagram of an example sharing interface 50. Client computing device 12 may output sharing interface 50 on a display operatively coupled to client computing device 50. As illustrated in the example of FIG. 2, sharing interface 50 may include a public area 52 and a private area 54. In the example of FIG. 2, public area 52 is labeled "shared items" and private area 54 is labeled "My private items." Furthermore, sharing interface 50 includes display elements 56A, 56B, 56C, 56D, 56E, and 56F (collectively, "display elements 56").

Each of display elements 56 comprises an image and a label. For example, display element 56B comprises an image of a mountain and has a label, "Colorado." In some instances, the image of a display element may indicate a type of the resource represented by the display element. For example, display element 56C may represent a recorded song entitled "Aces High." In this example, the image of display element 56 is a musical note. In some examples, all display elements that represent recorded songs have the same musical note image. In other instances, the image of a display element may be specific to the resource represented by the display element. For example, display element 56B may represent a photograph. In this example, the image of display element 56B may be a thumbnail version of the photograph. In another example, display element 56A may represent a social networking profile of user 22. In this example, the image of display element 56A may be the profile picture of the social networking profile of user 22. In some instances, a display element may also include an identifier of a user who is sharing a resource represented by the display element.

Display elements 56A, 56B, and 56C are in public area 52. Display elements 56A, 56B, and 56C represent resources shared by user 20 or by users of devices proximate to client computing device 12. In the example of FIG. 2, display element 56A may represent a social networking profile of a user of a proximate device. Display element 56B may represent a photograph shared by a user of a proximate device. Display element 56C may represent a recorded song shared by a user of a proximate device.

Display elements 56D, 56E, and 56F are in private area 54. Display elements 56D, 56E, and 56F may represent resources that are not currently shared by user 20. In the example of FIG. 2, display element 56D represents a document entitled "Spec." Display element 56E represents a postal address. Display element 56F represents a photograph entitled "Henry."

In some examples, client computing device 12 may automatically populate display elements into private area 54. In such examples, client computing device 12 may automatically populate display elements into private area 54 based on frequencies at which user 20 shares the resources represented by the display elements. Furthermore, in some examples, client computing device 12 may provide one or more interfaces that enable user 20 to select which resources are represented by display elements in private area 54. In some examples, client computing device 12 may display additional display elements in private area in response to input, such as a horizontal swiping gesture, from user 20.

Furthermore, in some examples, client computing device 12 may provide controls, such as buttons, that enable user 20 to add display elements to private area 54. For example, client computing device 12 may provide a maps application. In this example, user 20 may use the maps application to search for an address. The maps application may then display a map of the area around the address. In this example, the maps application may include a control that, when selected, causes a display element that represents the address to appear in private area 54. In another example, client computing device 12 may include an address book application. The address book application may include controls associated with entries in an address book. Client computing device 12 may add a display element that represents a given person's contact information to private area 54 when user 20 selects the control associated with the entry for the given person. Similar controls may be present in other applications or features of client computing device 12, such as a web browser application, an image viewer application, and so on. Furthermore, web pages may include controls that enable user 20 to add resources to private area 54.

Figure 3:
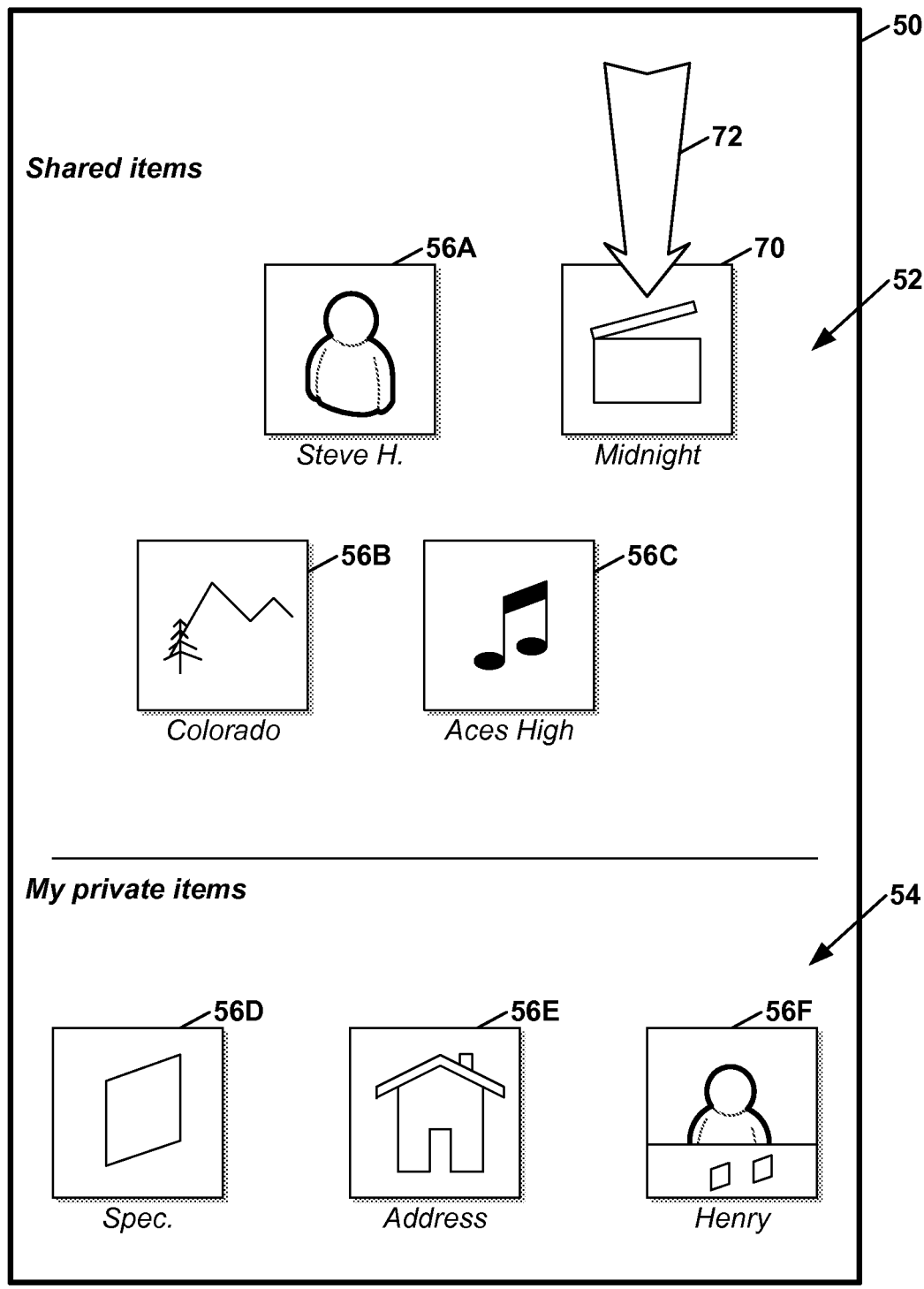
FIG. 3 illustrates an exemplary way that the client computing device may update the sharing interface when a user of a proximate device shares a resource.

FIG. 3 illustrates an exemplary way that client computing device 12 may update sharing interface 50 when a user of a proximate device shares a resource. A user of a device proximate to client computing device 12 may use a sharing interface similar to sharing interface 50 to share a resource with users who are proximate to the device. For example, user 22 may use a sharing interface displayed by client computing device 14 to share a resource with users who are proximate to client computing device 14.

When the user of a device proximate to client computing device 12 shares a resource, a display element 70 representing the resource may appear in public area 52 of sharing interface 50. In the example of FIG. 3, display element 70 represents a video entitled "Midnight." In some examples, client computing device 12 may cause display element 70 to appear in various ways. For example, if client computing device 12 is outputting sharing interface 50 when the user of the proximate device shares the resource, client computing device 12 may show display element 70 as moving vertically down from a top of sharing interface 50 into public area 52. An arrow 72 represents this vertical movement of display element 70.

In some instances, client computing device 12 may move display elements 56 within sharing interface 50 when client computing device 12 adds a new display element to sharing interface 50. Furthermore, in some examples, client computing device 12 may remove one or more display elements from public area 52 if there is not enough space in public area 52 to show all display elements shared by users of proximate devices. In some such examples, client computing device 12 may remove display elements that have been shared for the longest time periods.

Figure 4:
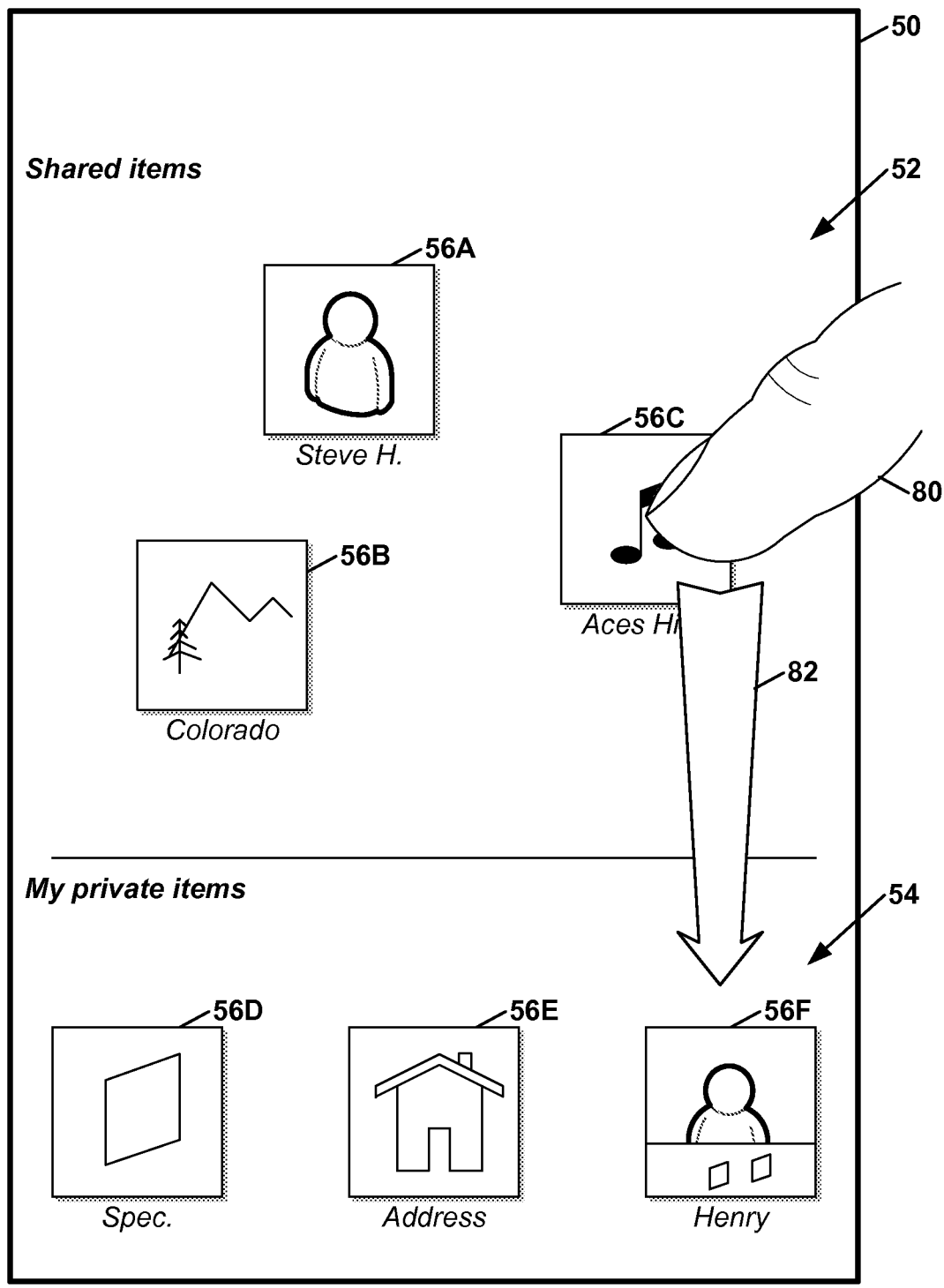
FIG. 4 illustrates an exemplary way in which the client computing device may receive capture input at the sharing interface.

FIG. 4 illustrates an exemplary way in which client computing device 12 may receive capture input on sharing interface 50. This disclosure assumes in the description of FIGS. 4-9 that client computing device 12 displays sharing interface 50 on a touchscreen. In other examples, client computing device 12 may display sharing interface 50 on other types of display screens. In such examples, gestures similar to those described below may be made using pointing devices or other input devices instead of a finger. For instance, the gestures may be made using a mouse, a stylus, trackball, or another type of device. In this disclosure, the word "finger" is meant to encompass fingers and thumbs.

Client computing device 12 may receive capture input on sharing interface 50 when user 20 wants to capture a resource shared by a user of a proximate device. Client computing device 12 may receive the capture input when client computing device 12 detects a sliding gesture at region of the touchscreen that extends from a display element in public area 52 to private area 54. For instance, user 20 may capture the resource represented by display element 56C by first touching finger 80 at the region of the touchscreen associated with display element 56C and then moving finger 80 downward into the region of the touchscreen associated with private area 54. An arrow 82 indicates the downward movement of finger 80.

Figure 5:
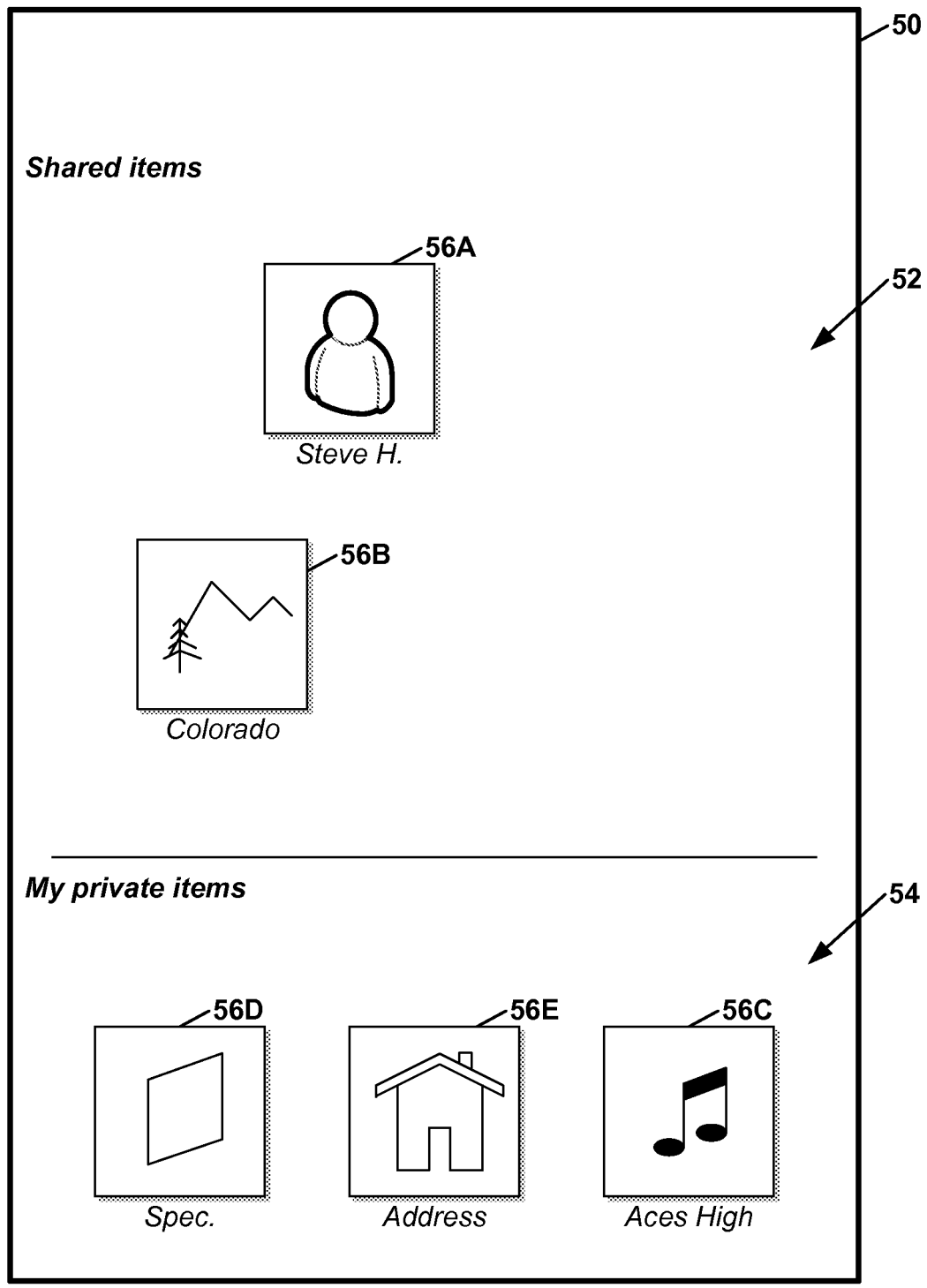
FIG. 5 illustrates the example sharing interface after the client computing device has received the capture input at the sharing interface.

FIG. 5 illustrates the example sharing interface 50 after client computing device 12 has received the capture input on sharing interface 50. In the example of FIG. 4, user 20 is shown moving display element 56C from public area 52 to private area 54. In FIG. 5, display element 56C is shown in private area 54. In some examples, client computing device 12 does not display a display element in private area 54 after user 20 has captured a resource represented by the display element.

Client computing device 12 may remove a display element from private area 54 if there is not enough space in private area 54 to show all display elements that represent resources not currently shared by user 20. In the example of FIG. 5, client computing device 12 has removed display element 56F from private area 54.

Figure 6:
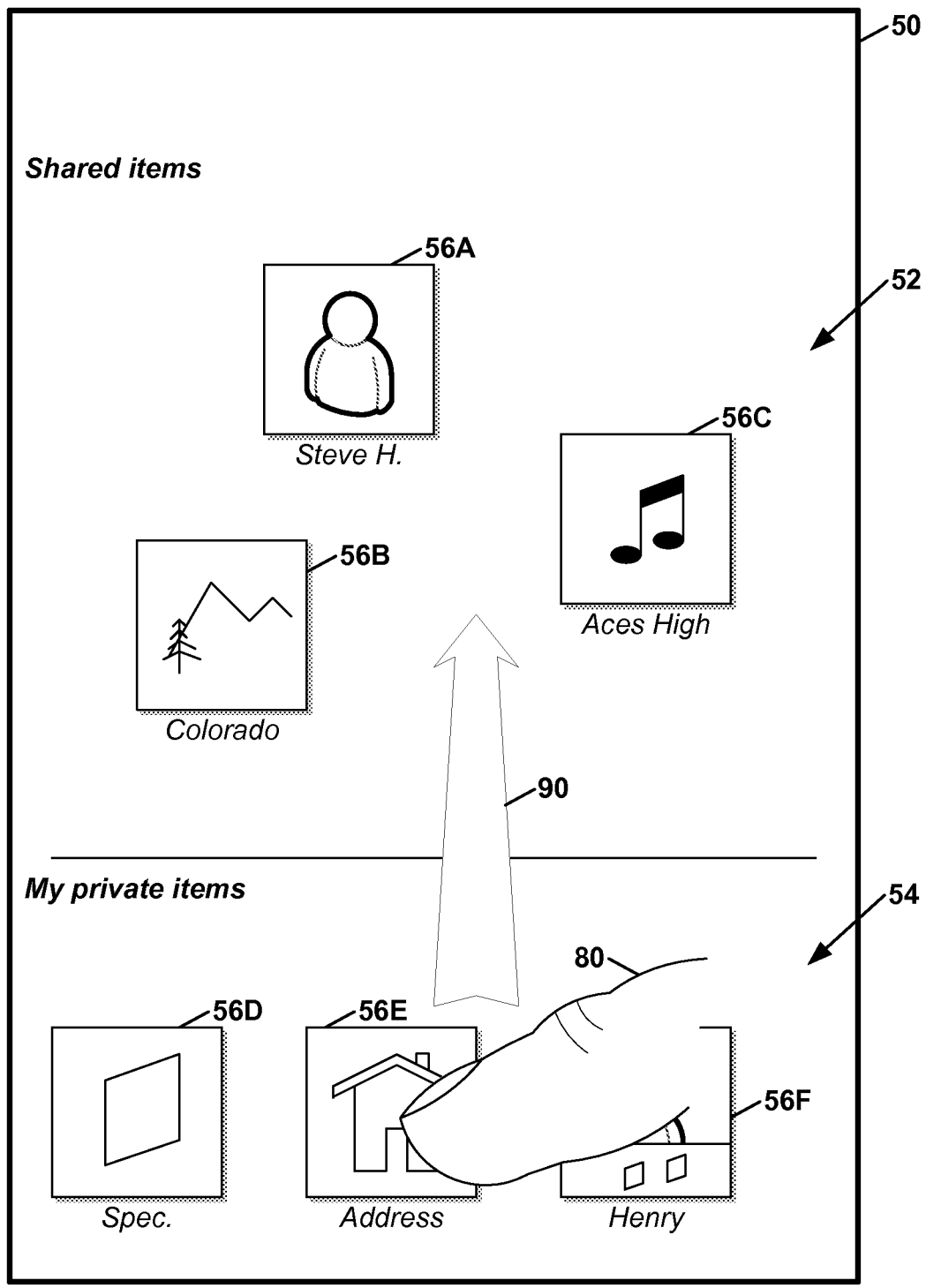
FIG. 6 illustrates an exemplary way in which the client computing device may receive sharing input at the sharing interface.

FIG. 6 illustrates an exemplary way in which client computing device 12 may receive sharing input on sharing interface 50. In the example of FIG. 6, client computing device 12 may receive sharing input when the touchscreen detects a sliding gesture at a region of the touchscreen extending from a display element in private area 54 to public area 52. In the example of FIG. 6, user 20 shares a resource associated with display element 56E by moving finger 80 from the region of the touchscreen associated with display element 56E to the region of the touchscreen associated with public area 52. An arrow 90 represents the movement of finger 80.

Figure 7:
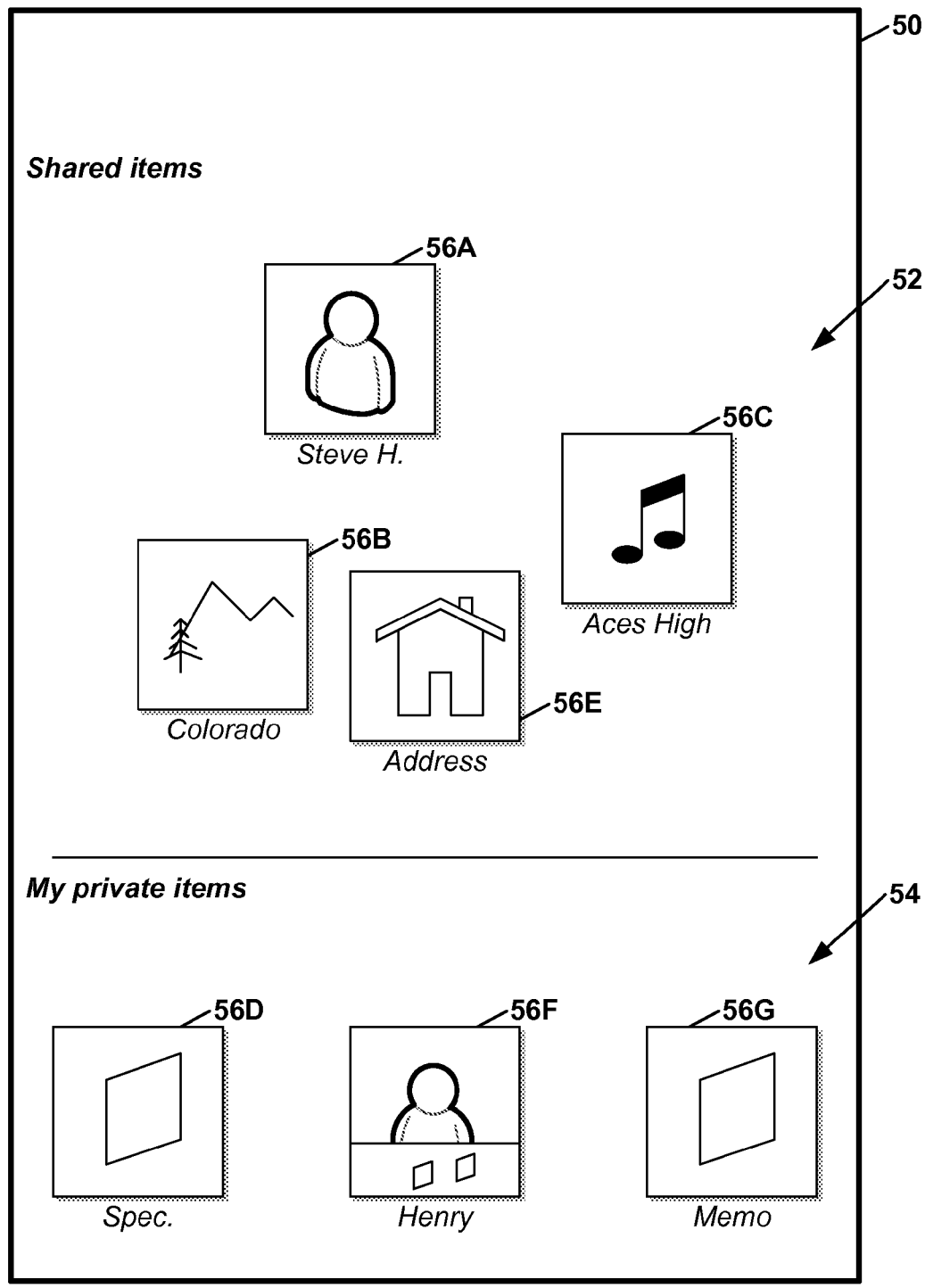
FIG. 7 illustrates the example sharing interface after the client computing device has received the sharing input of FIG. 6.

FIG. 7 illustrates the example sharing interface 50 after client computing device 12 has received the sharing input of FIG. 6. As shown in the example of FIG. 6, user 20 makes a sliding gesture to move display element 56E from private area 54 to public area 52. After user 20 makes this sliding gesture, client computing device 12 may show display element 56E in public area 52, as shown in the example of FIG. 7.

After user 20 has moved a display element from private area 54 to public area 52, client computing device 12 may show an additional display element in private area 54 in place of the display element. For instance, in the example of FIG. 7, client computing device 12 shows display element 56G in private area 54 in place of display element 56E.

Figure 8:
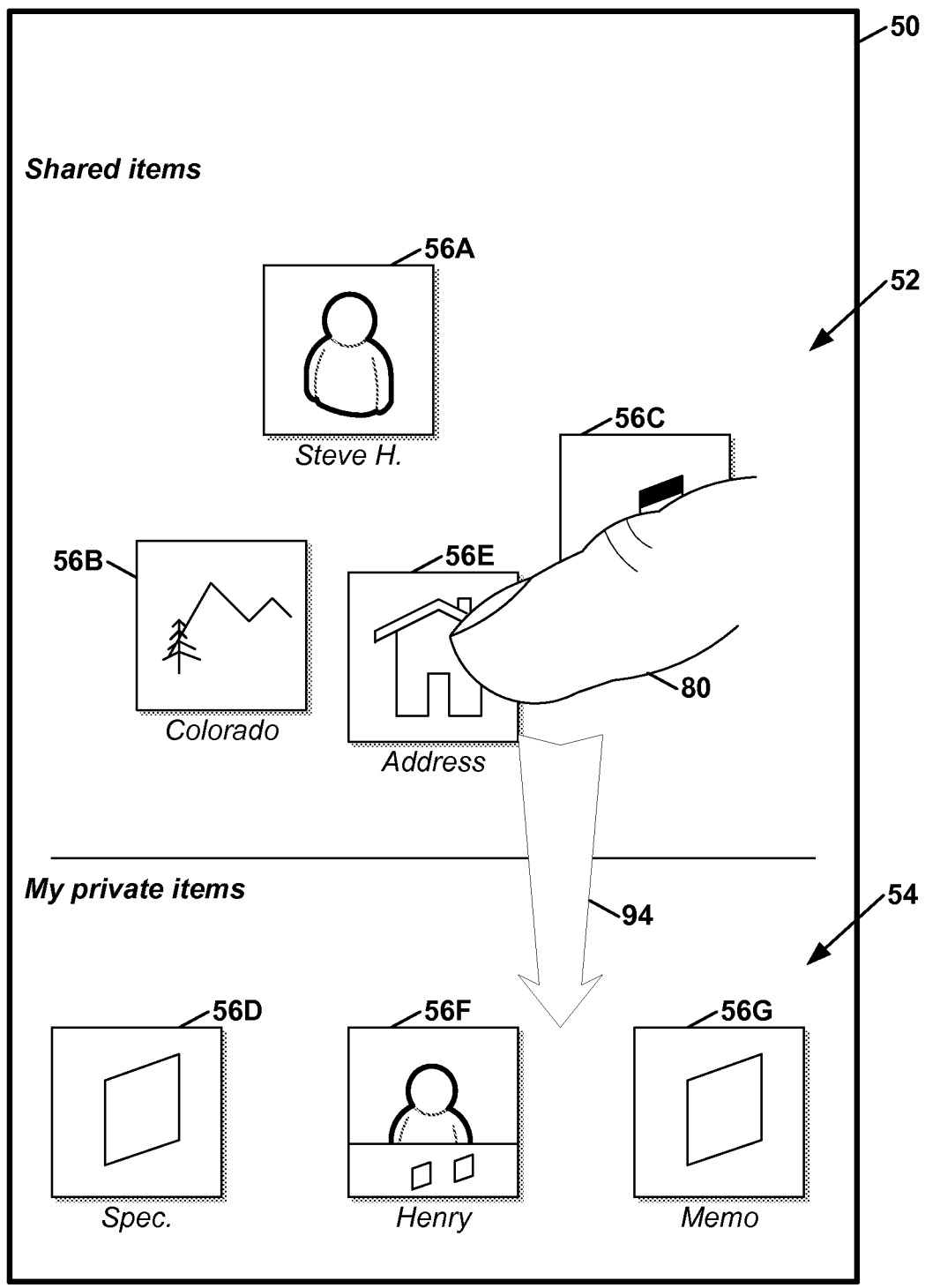
FIG. 8 illustrates an exemplary way in which the client computing device may receive unsharing input at the sharing interface.

FIG. 8 illustrates the exemplary way in which client computing device 12 may receive unsharing input on sharing interface 50. After user 20 shares a resource with users of proximate devices, user 20 may decide to stop sharing the resource. When user 20 decides to stop sharing the resource, user 20 may provide unsharing input to client computing device 12. When client computing device 12 receives the unsharing input, client computing device 12 may notify server system 16 that user 20 is no longer sharing the resource. In response, server system 16 may send messages to the devices proximate to client computing device 12 indicating that the resource is no longer being shared. The proximate devices may then remove display elements representing the resource from sharing interfaces of the devices currently proximate to client computing device 12.

In the example of FIG. 8, the unsharing input may comprise input to move a display element that represents a resource shared by user 20 from public area 52 back to private area 54. In some examples, user 20 may provide the unsharing input by making a sliding gesture on the touchscreen from a display element representing the resource to private area 54. As shown in the example of FIG. 8, display element 56E may represent a resource shared by user 20. User 20 may provide unsharing input to client computing device 12 by moving finger 80 downward from display element 56E to private area 54. An arrow 94 indicates the movement of finger 80 downward from display element 56E to private area 54. Thus, client computing device 12 may receive the unsharing input when the touchscreen of client computing device 12 detects a sliding gesture from a region of the touchscreen associated with display element 56E to a region of the touchscreen associated with private area 54.

Figure 9:
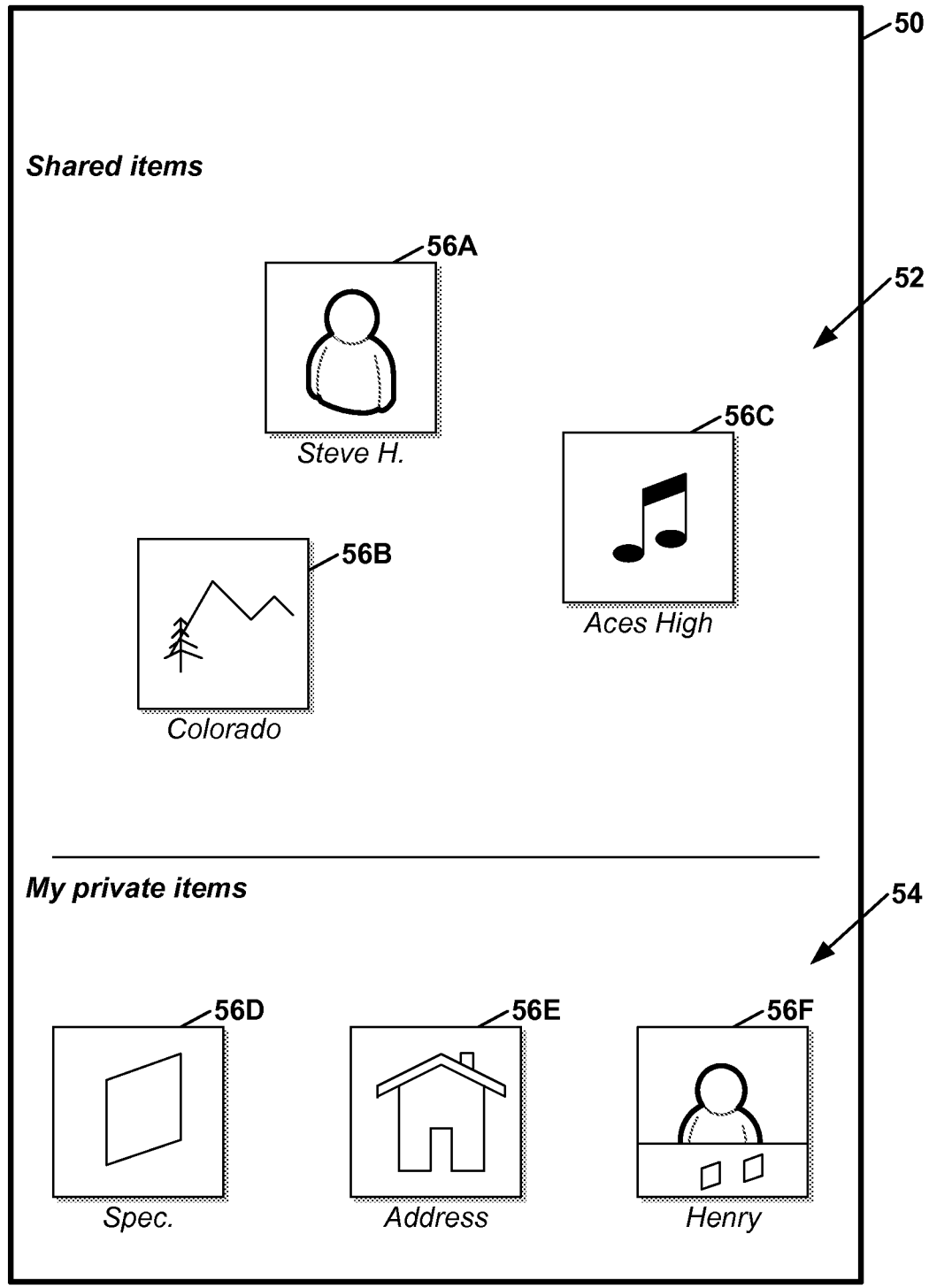
FIG. 9 illustrates the example sharing interface after the client computing device has received the unsharing input of FIG. 8.

FIG. 9 illustrates the example sharing interface 50 after client computing device 12 has received the unsharing input of FIG. 8. As shown in the example of FIG. 9, private area 54 of sharing interface 50 may again show display element 56E. When client computing device 12 receives the unsharing input, client computing device 12 may remove one or more display elements from private area 54 if there is not enough space in private area 54 to show the display element that represents the unshared resource. For instance, in the example of FIG. 9, client computing device 12 has removed display element 56G from private area 54.

Figure 10:
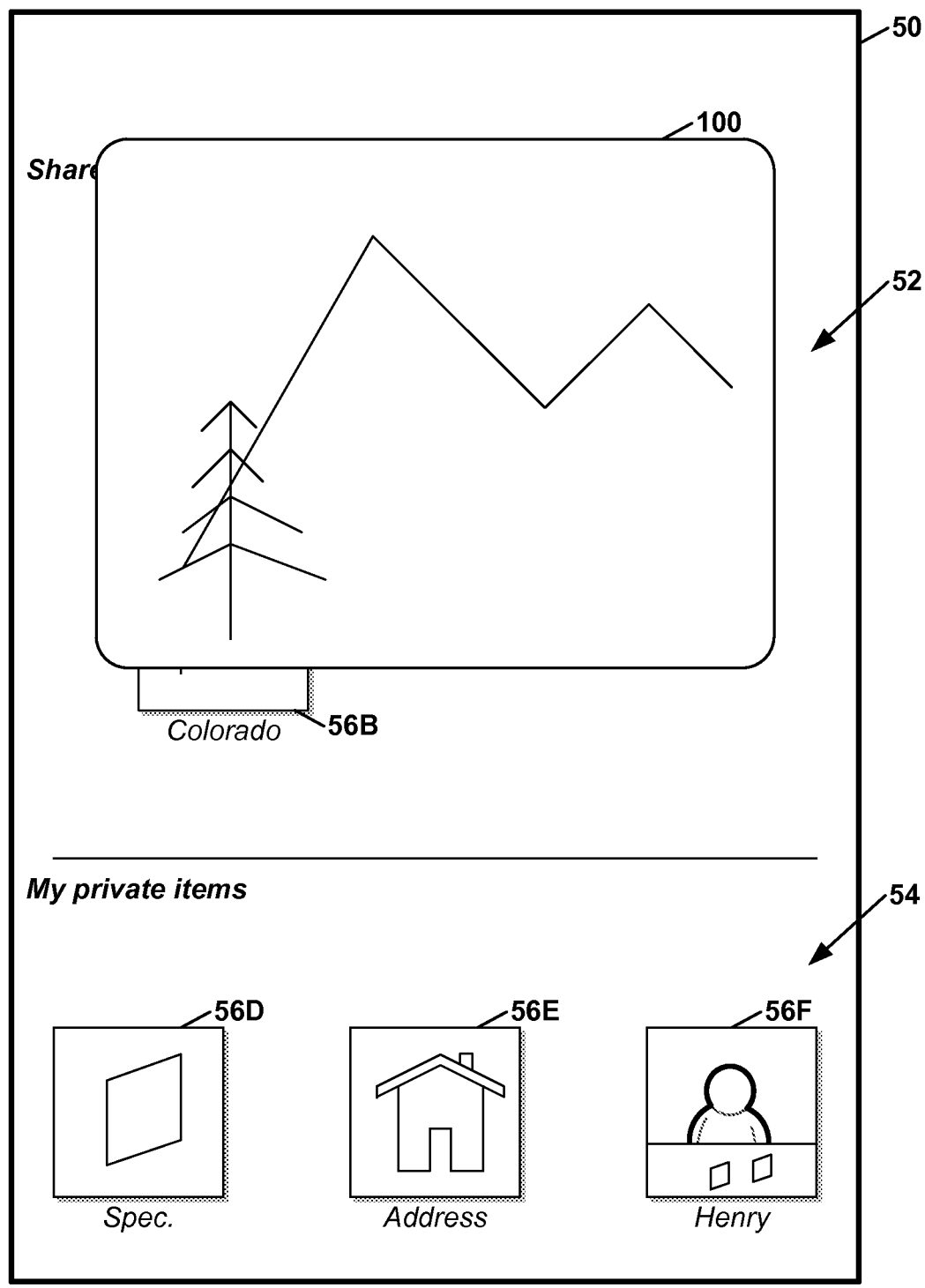
FIG. 10 illustrates the example sharing interface after the client computing device has received preview input.

FIG. 10 illustrates the example sharing interface 50 after client computing device 12 has received preview input. In some examples, user 20 may provide preview input to client computing device 12. The preview input may indicate one of display elements 56. In various examples user 20 may provide preview input indicating a given display element in various ways. For example, user 20 may provide the preview input by making a tapping gesture on the given display element. In other words, the touchscreen of client computing device 12 may receive a tapping gesture on a region of the touchscreen associated with the given display element.

In response to receiving the preview input, client computing device 12 may display a preview pane 100 within sharing interface 50. Preview pane 100 may contain additional information about a resource represented by the display element indicated by the preview input. For example, if the resource represented by the display element is an image, preview pane 100 may contain a larger version of the image. In another example, if the resource represented by the display element is a music recording, preview pane 100 may contain controls for playing back the music recording. In yet another example, if the resource represented by the display element is a document, preview pane 100 may contain metadata regarding the document.

In the example of FIG. 10, user 20 has provided preview input indicating display element 56B. As mentioned above, display element 56B represents an image. Accordingly, preview pane 100 shows a larger version of the image.

Figure 11:
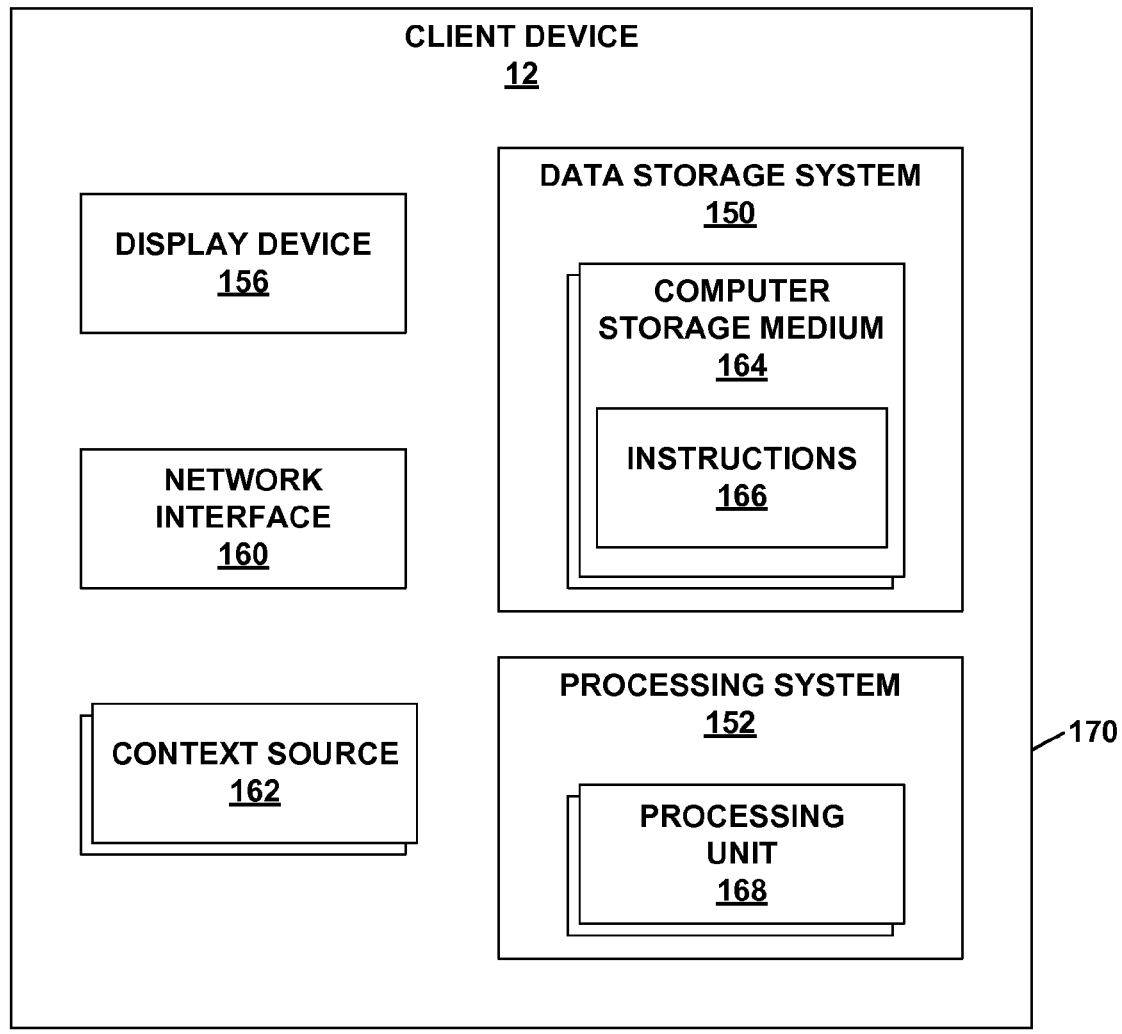
FIG. 11 is a conceptual block diagram that illustrates an example configuration of a client computing device.

FIG. 11 is a conceptual block diagram that illustrates an example configuration of client computing device 12. As shown in the example of FIG. 11, client computing device 12 comprises a data storage system 150, a processing system 152, a display device 156, a network interface 160, and one or more context sources 162. Other devices in system 10, such as client computing device 14, may have similar configurations to the example configuration shown in FIG. 11.

Data storage system 150 may store data, such as program data and instructions. Data storage system 150 may comprise one or more computer storage media 164. One or more of computer storage media 164 store instructions 166. As used in this disclosure, a computer-readable medium is a medium from which a computer can read data. The term computer-readable media can refer to computer storage media and communications media. Computer storage media 164 include physical devices that store data for subsequent retrieval. Computer storage media 164 are not transitory. For instance, computer storage media 164 do not exclusively comprise propagated signals. Computer storage media 164 may include volatile storage media and non-volatile storage media. Example types of computer storage media 164 may include random-access memory (RAM) units, read-only memory (ROM) devices, solid state memory devices, optical discs (e.g., compact discs, DVDs, BluRay discs, etc.), magnetic disk drives, magnetic tape drives, and other types of devices that store data for subsequent retrieval. Communication media include media over which one device can communicate data to another device. Example types of communication media include communication networks, communications cables, wireless communication links, communication buses, and other media over which one device is able to communicate data to another device.

Processing system 152 may be coupled to data storage system 150 such that processing system 152 is able to read instructions 166 from data storage system 150 and execute instructions 166. In other examples, processing system 152 may read instructions from one or more other computer readable media. Processing system 152 may comprise one or more processing units 168. Processing units 168 may comprise physical devices that execute instructions 166. Processing units may comprise various types of physical devices that execute instructions. For example, a processing unit may comprise a microprocessor, a processing core within a microprocessor, a digital signal processor, a graphics processing unit, a general-purpose graphics processing unit, or another type of physical device that capable of execution instructions.

Execution of instructions 166 by processing system 152 may cause client computing device 12 to perform various operations, such as those ascribed in this disclosure to client computing device 12 and some components of client computing device 12. For example, execution of instructions 166 by processing system 152 may cause client computing device 12 to perform the example operations illustrated in FIGS. 13 and 14.

Display device 156 displays graphical data, such as GUIs. In some examples, display device 156 may be a touchscreen that enables client computing device 12 to receive input data that indicate inputs from user 10. Although not illustrated in the example of FIG. 11, client computing device 12 may include or be communicatively coupled to one or more other types of input devices, such as keypads, keyboards, microphones, cameras, accelerometers, mice, trackballs, and other types of devices that receive input from users.

Display device 156 may be operatively coupled to client computing device 12. In various examples, display device 156 may be operatively coupled to client computing device 12 in various ways. For instance, in the example of FIG. 11, display device 156 is shown as being within a housing 170 of client computing device 12. In other examples, display device 156 may be outside housing 170. In some examples, display device 156 may be entirely separate from client computing device 12. In such instances, client computing device 12 may output GUIs and other graphical data at display device 156 by communicating with one or more other computing devices. In such examples, client computing device 12 may communicate with the other computing devices over a network, such as network 18. For instance, in such examples, client computing device 12 may display the tagging interface at display device 156 at least in part by generating and sending hypertext markup language (HTML) data to a computing device that is physically coupled to display device 156. In such an instance, the other computing device may render the HTML data to display the sharing interface at display device 156.

Network interface 160 may include one or more devices or assemblies that enable client computing device 12 to communicate with other computing devices via network 18. In various examples network interface 160 may include one or more wireless network adapters, network interface cards, or other types of devices that enable client computing device 12 to communicate with other computing devices via network 18.

Context sources 162 may include one or more devices or assemblies that generate context data. In various examples, context sources 162 may include various types of devices that generate context data. For example, context sources 162 may include a global positioning system (GPS) receiver, one or more accelerometers that detect movement and local vibration, a compass, gyroscopes, a microphone, and a camera or light meter to determine amounts or qualities of light in the area around client computing device 12.

Figure 12:
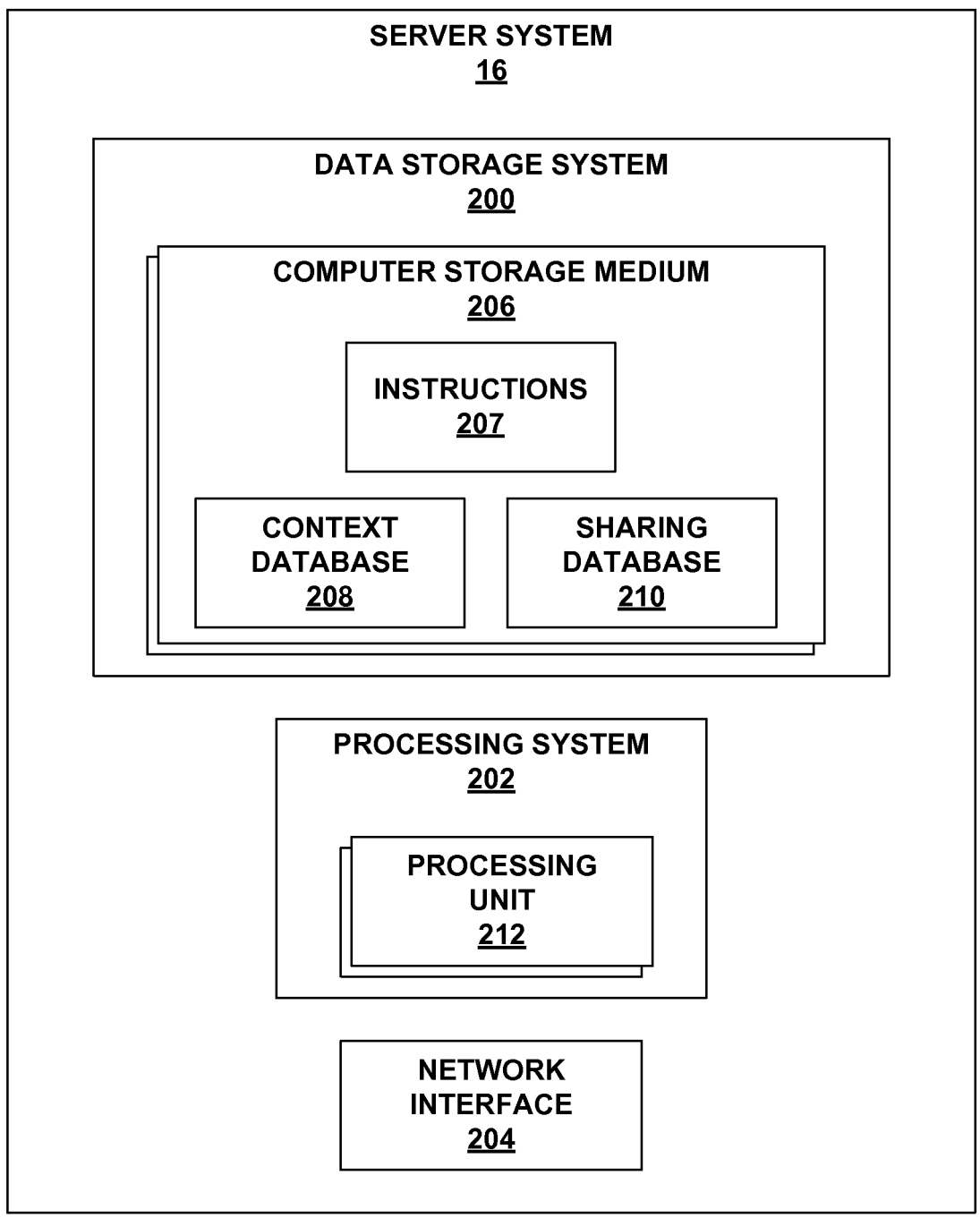
FIG. 12 is a conceptual block diagram that illustrates an example configuration of a server system.

FIG. 12 is a conceptual block diagram of an example configuration of server system 16. As illustrated in the example of FIG. 12, server system 16 may comprise a data storage system 200, a processing system 202, and a network interface 204. Data storage system 200 may include a system for storing data. Data storage system 200 may contain one or more computer storage media 206. One or more of computer storage media 206 store instructions 207. In addition, one or more of computer storage media 206 may store all or parts of a context database 208 and a sharing database 210. This disclosure describes context database 208 and sharing database 210 in greater detail with regard to the example of FIG. 15. In some examples, context database 208 and sharing database 210 are implemented using a single database. Network interface 204 may comprise one or more devices or apparatuses that enable server system 16 to communicate with other computing device on a network, such as network 18.

Processing system 202 may be coupled to data storage system 200 such that processing system 202 is able to read instructions 207 from data storage system 200 and execute instructions 207. As illustrated in the example of FIG. 12, processing system 202 may comprise one or more processing units 212 that execute instructions 207. Execution of instructions 207 may cause server system 16 to perform various actions. For example, execution of instructions 207 may cause server system 16 to perform actions ascribed in this disclosure to server system 16. For example, execution of instructions 207 may cause server system 16 to perform the operation illustrated in the example of FIG. 15.

Figure 13:
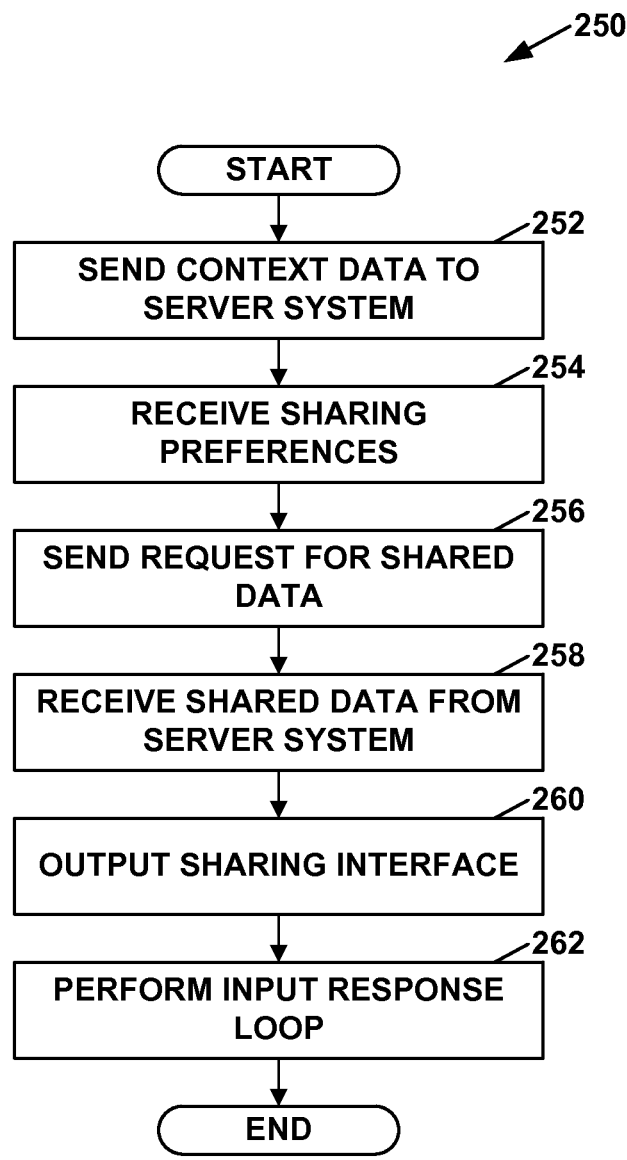
FIG. 13 is a flowchart that illustrates an example operation of the client computing device.

FIG. 13 is a flowchart illustrating an example operation 250 of client computing device 12. Other client devices in system 10, such as client computing device 14, may perform operations similar to operation 250.

After client computing device 12 starts operation 250, client computing device 12 may send context data to server system 16 (252). The context data may provide information about one or more aspects of a physical environment of client computing device 12. For example, the context data may provide information about a geographical location of client computing device 12 calculated by a Global Positioning System (GPS) system in client computing device 12, vibrations detected by accelerometers of client computing device 12, sounds detected by microphones of client computing device 12, identifiers and signal strengths of wireless access points detected by client computing device 12, light levels detected by a light meter of client computing device 12, signal attenuation information for wireless signals detected by client computing device 12, near-field communication (NFC) devices detected by client computing device 12, personal area network devices (e.g., Bluetooth devices) detected by client computing device 12, and other information about the physical environment of client computing device 12. Client computing device 14 and/or other devices in system 10 may generate context data that provide similar information about aspects of the physical environments of client computing device 14 and/or other devices in system 10.

In various examples, client computing device 12 may send the context data to server system 16 in response to various events. For example, client computing device 12 may send the context data to server system 16 on a recurring periodic basis. In another example, client computing device 12 may send the context data to server system 16 when client computing device 12 receives input from user 20 to display sharing interface 50.

In some examples, user 20 may configure which types of context data client computing device 12 sends to server system 16. For example, client computing device 12 may display a privacy settings interface to user 20. The privacy settings interface may include controls that enable user 20 to select which, if any, types of context data are sent to server system 16.

In addition, client computing device 12 may receive sharing preferences from user 20 (254). The sharing preferences may control who is able to capture or preview a resource shared by user 20. In some examples, client computing device 12 may prompt user 20 to provide the sharing preferences when client computing device 12 receives sharing input from user 20. In other examples, client computing device 12 may receive the sharing preferences at other times, such as during set up of an application that causes client computing device 12 to display the sharing interface.

In various examples, the sharing preferences may control who is able to capture or preview a resource in various ways. For example, the sharing preferences may indicate that confirmation from user 20 may be required before another user may preview and/or capture a resource shared by user 20. In this example, the sharing preferences may indicate that confirmation from user 20 may be required before a person who is not in a previously-defined list may preview and/or capture a resource shared by user 20. In this example, the previously-defined list may be a list of people who are connected to user 20 in a social networking service. In this example, confirmation from user 20 may not be required for a person who is on the previously-defined list. In another example, the sharing preferences may indicate a characteristic of people who are allowed to preview and/or capture the resource. For instance, the sharing preferences may indicate that only people who are able to provide a password are allowed to preview and/or capture the resource. In this example, user 20 may be able to give the password to someone verbally because the other user may be close by to user 20. In another instance, the sharing preferences may indicate that only people who are connected to user 20 in a social networking system are able to preview and/or capture the resource. In yet another example, the sharing preferences may indicate that user 20 stops sharing a resource as soon as anyone captures the resource.

Furthermore, client computing device 12 may send a request to server system 16 for shared data (256). Subsequently, client computing device 12 may receive shared data from server system 16 (258). The shared data may indicate resources shared by users of devices that are proximate to client computing device 12. For instance, the shared data may include uniform resource identifiers (URIs) of resources shared by users of the proximate devices. In addition, the shared data may include data representing images and titles of the shared resources. Furthermore, the shared data may include other data associated with the shared resources.

After receiving the shared data, client computing device 12 may output a sharing interface on a display coupled to client computing device 12 (260). For instance, client computing device 12 may output the sharing interface at display device 156. In various examples, client computing device 12 may display various sharing interfaces. For example, client computing device 12 may display sharing interface 50. In other examples, client computing device 12 may display sharing interfaces that have different appearances than sharing interface 50. In some examples, an application that displays the sharing interface may only permit client computing device 12 to keep the sharing interface open for a limited time per day. For instance, the sharing interface may only be open for a maximum of two hours per day. Limiting the amount of time that the sharing interface is open may power consumption and limit the potential for people to abuse the sharing system.

Figure 14:
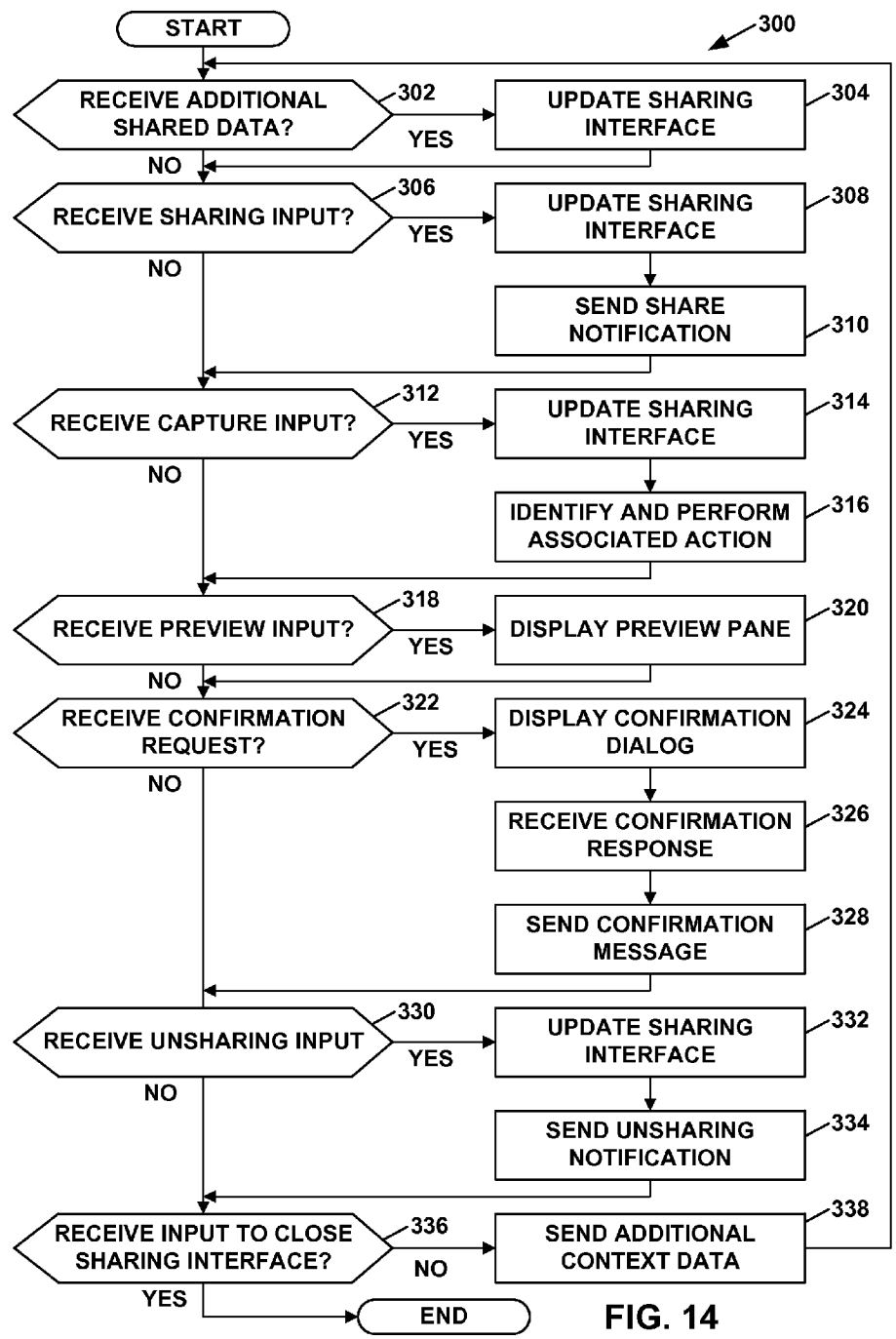
FIG. 14 is a flowchart illustrating an example input response loop performed by the client computing device.

When client computing device 12 displays the sharing interface, client computing device 12 may perform an input response loop (262). While client computing device 12 is performing the input response loop, client computing device 12 may receive input at the sharing interface from user 20. FIG. 14, described in detail below, illustrates an example input response loop performed by client computing device 12 while client computing device 12 displays the sharing interface. In other examples, client computing device 12 may perform input response loops that are different than the input response loop shown in the example of FIG. 14. Operation 250 may end after the input response loop ends.

FIG. 14 is a flowchart illustrating an example input response loop 300 performed by client computing device 12. After client computing device 12 starts performing input response loop 300, client computing device 12 may determine whether client computing device 12 has received additional shared data from server system 16 (302). Client computing device 12 may receive additional shared data from server system 16 if a user of a proximate device shares or unshares a resource while client computing device 12 is outputting the sharing interface. In addition, client computing device 12 may receive additional shared data from server system 16 if server system 16 determines that one or more devices whose users are sharing resources are no longer proximate to client computing device 12. The additional shared data may indicate which resources are currently being shared by users of proximate devices. In some examples, client computing device 12 periodically polls server system 16 for additional shared data. In other words, client computing device 12 may periodically send requests for shared data to server system 16.

If client computing device 12 has received additional sharing input from server system 16 ("YES" of 302), client computing device 12 may update the sharing interface to reflect the resources that are currently being shared by users of the devices that are currently proximate to client computing device 12 (304). For example, client computing device 12 may update the sharing interface to remove a display element from public area 52 when a person who is sharing a resource represented by the display element moves out of a vicinity of client computing device 12.

Furthermore, client computing device 12 may determine whether client computing device 12 has received sharing input from user 20 (306). The sharing input may indicate that user 20 wants to share a resource with users of proximate devices. As discussed above, client computing device 12 may receive sharing input when user 20 moves a display element from the private area of the sharing interface to the public area of the sharing interface.

If client computing device 12 has received sharing input ("YES" of 306), client computing device 12 may update the sharing interface to show the display element that represents the resource in the public area of the sharing interface (308). In addition, client computing device 12 may send a share notification to server system 16 (310). The share notification indicates to server system 16 that user 20 is currently sharing the resource. In some examples, the share notification may include a copy of the resource. Furthermore, in some examples, the share notification may include the sharing preferences for the resource. In some examples, the share notification may also include metadata regarding the resource, such as data identifying a type or title of the resource. Furthermore, in some examples, the share notification may identify user 20.

During performance of input response loop 300, client computing device 12 may also determine whether client computing device 12 has received capture input (312). As discussed above, client computing device 12 may receive capture input when user 20 moves a display element from the public area of the sharing interface to the private area of the sharing interface. If client computing device 12 has received capture input ("YES" of 312), client computing device 12 may update the sharing interface to move the display element indicated by the capture input from the public area to the private area (314).

Furthermore, if client computing device 12 has received capture input, client computing device 12 may identify and perform an action associated with the resource represented by the display element indicated by the capture input (316). Various actions may be associated with various resources. Such actions may or may not involve copying resources to client computing device 12. Because different actions may be associated with different resources, client computing device 12 may perform actions that are intuitively connected with different types of resources.

In order to perform the action associated with the resource, client computing device 12 may first identify the action associated with the resource based on the shared data. In various examples, client computing device 12 may identify the action associated with the resource based on the shared data in various ways. For example, the shared data may include a URI that identifies the resource captured by user 20. In this example, client computing device 12 may identify the action associated with the resource based on the URI. For instance, the URI may include a filename extension, such as .jpg, .docx, .htm, etc. In this example, client computing device 12 may maintain a mapping from filename extensions to applications that are installed or installable on client computing device 12. Different filename extensions may be mapped to different applications. When client computing device 12 receives the capture input, client computing device 12 may identify an application associated with the filename extension indicated by the URI of the captured resource. Client computing device 12 may then launch the identified application, providing the URI as an input parameter. The application may then use the URI of the resource to perform an action associated with the resource. For instance, if the URI includes a .jpg filename extension, client computing device 12 may launch an image viewer application that displays an image associated with the resource. In another example, if the URI includes a .docx application, client computing device 12 may launch a word processor application that opens a document associated with the resource. In other examples, client computing device 12 may use other portions of the URI of resources to identify actions to perform when user 20 captures the resources.

In another example, the shared data may include other metadata regarding a resource. In this example, client computing device 12 may interpret the metadata to identify an action to perform when user 20 captures the resource. For instance, in this example, the shared data may include information that identifies an electronic resource as an electronic business card. Based on this information, client computing device 12 may retrieve contact information of the business card and automatically add the contact information directly into an electronic address book.

In another example, the shared data may include metadata that indicate an action to perform when a resource is captured. For instance, the shared data may indicate that client computing device 12 is to open a web browser window and navigate to a particular website when user 20 captures the resource. Alternatively, the shared data may indicate that client computing device 12 is to send a particular web services request to a web service when user 20 captures the resource. For instance, in this example, the resource may be an invitation to an event, chat session, video conferencing session, mailing list, etc. In this instance, the shared data may indicate that client computing device 12 is to navigate a web browser window to a webpage that describes the event. Alternatively, the shared data may instruct client computing device 12 to transmit a message indicating that user 20 accepts the invitation to the event when user 20 captures the resource. In another example, the shared data may indicate that client computing device 12 is to access an online store to download an application, video, music file, or other resource when user 20 captures the resource. In these examples, client computing device 12 may send a Hypertext Transfer Protocol (HTTP) request that specifies the URI of the resource.

In another example, the shared data may include computer-readable instructions associated with a resource. In this example, client computing device 12 may execute or interpret the computer-readable instructions when user 20 captures the resource. In other words, client computing device 12 may perform the computer-readable instructions in response to capture input to move the display element representing the resource from the public area to the private area. Server system 16 may implement security measures to reduce the risk that the computer-readable instructions are harmful.

As mentioned above, different actions may be associated with different resources. For instance, the public area of the sharing interface may include a first display element and a second display element. The first display element may represent a first resource shared by a user of one of the proximate devices and the second display element may represent a second resource shared by a user of one of the proximate devices. Client computing device 12 may receive a first capture input to move the first display element from the public area to the private area. In response to the first capture input, client computing device 12 may identify a first action as being associated with the first resource based on the shared data. After identifying the first action as being associated with the first resource, client computing device 12 may perform the first action. In addition, client computing device 12 may receive a second capture input to move the second display element from the public area to the private area. In response to the second capture input, client computing device 12 may identify a second action as being associated with the second resource based on the shared data. After identifying the second action as being associated with the second resource, client computing device 12 may perform the second action. The second action may be different than the first action. For instance, client computing device 12 may launch or invoke a first application in response to the first capture input and may launch or invoke a second application in response to the second capture input. The second application may be different than the first application.

Client computing device 12 may also determine whether client computing device 12 has received preview input (318). As discussed above, user 20 may provide the preview input to client computing device 12 to view information about a resource while a display element that represents the resource remains in the public area. If client computing device 12 has received preview input ("YES" of 318), client computing device 12 may display a preview pane that presents information about the resource (320).

Client computing device 12 may also determine whether client computing device 12 has received a confirmation request from server system 16 (322). Client computing device 12 may receive a confirmation request from server system 16 when user 20 has shared a resource and the sharing preferences for the resource require users to obtain confirmation from user 20 before previewing and/or capturing the resource. If client computing device 12 has received a confirmation request from server system 16 ("YES" of 322), client computing device 12 may display a confirmation dialog in the sharing interface (324). The confirmation dialog may prompt user 20 to confirm whether to allow a given user to preview and/or capture the resource. The confirmation dialog may include information that identifies the given user.

While client computing device 12 displays the confirmation dialog, client computing device 12 may receive a confirmation response from user 20 (326). The confirmation response indicates whether user 20 confirms that the given user is allowed to preview and/or capture the resource. In addition, the confirmation dialog may include controls that enable user to provide the confirmation response to client computing device 12. After client computing device 12 receives the confirmation response, client computing device 12 may send a confirmation message to server system 16 (328). The confirmation message may indicate whether user 20 confirmed that the given user is allowed to preview and/or capture the resource.

In addition, client computing device 12 may determine whether client computing device 12 has received unsharing input from user 20 (330). As described above, client computing device 12 may receive unsharing input when user 20 moves a display element that represents a resource shared by user 20 from the public area to the private area of the sharing interface. If client computing device 12 has received unsharing input ("YES" of 330), client computing device 12 may update the sharing interface to show the display element indicated by the unsharing input in the private area of the sharing interface (332). In addition, client computing device 12 may send an unsharing notification to server system 16 (334). The unsharing notification may indicate to server system 16 that user 20 is no longer sharing a resource represented by the display element indicated by the unsharing input.

Furthermore, client computing device 12 may determine whether client computing device 12 has received input from user 20 to close the sharing interface (336). If client computing device 12 has received input from user 20 to close the sharing interface ("YES" of 336), client computing device 12 may stop performing input response loop 300. Otherwise, if client computing device 12 has not received input from user 20 to close the sharing interface ("NO" of 336), client computing device 12 may send additional context data to server system 16 (338). The additional context data may include context data generated after a last time that client computing device 12 sent context data to server system 16. Client computing device 12 may then perform input response loop 300 again.

Figure 15:
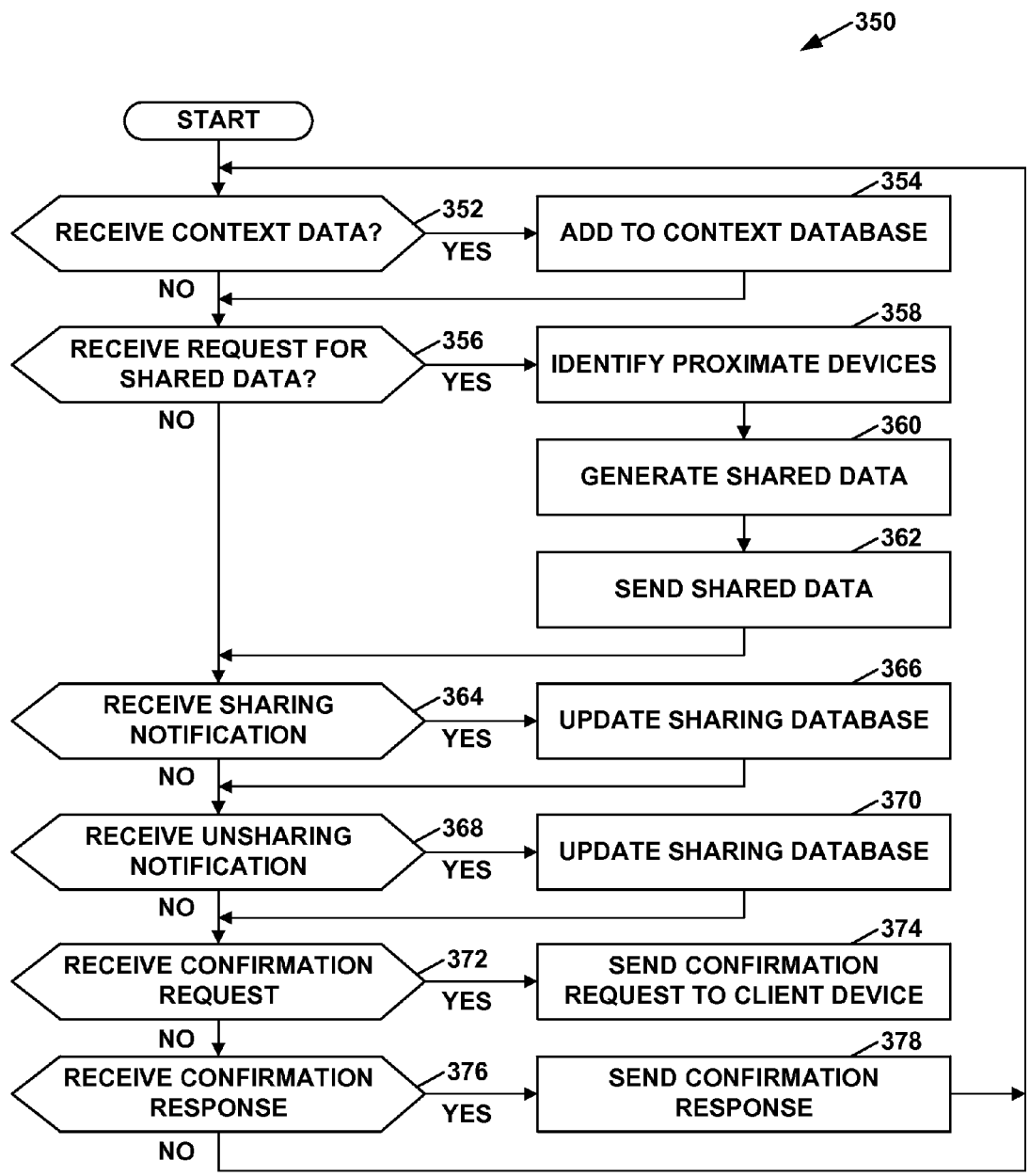
FIG. 15 is a flowchart that illustrates an example operation of the server system.

FIG. 15 is a flowchart illustrating an example operation 350 of server system 16. After server system 16 starts performing operation 350, server system 16 may determine whether context data has been received (352). If server system 16 has received context data ("YES" of 352), server system 16 may add the context data to context database 208 (354). In various examples, server system 16 may store the context data in context database 208 in various ways. For example, context database 208 may comprise a relational database. In this example, server system 16 may store the context data in context database 208 by generating one or more records in the relational database.

During performance of operation 350, server system 16 may also determine whether server system 16 has received a request for shared data from a client computing device, such as client computing device 12 (356). If server system 16 has received a request for shared data from client computing device 12 ("YES" of 356), server system 16 may use the context data in context database 208 to identify devices that are currently proximate to client device 12 (358). In various examples, server system 16 may identify the devices that are proximate to client computing device 12 in various ways. For example, server system 16 may receive context data that indicate various aspects of the physical environments of client computing device 12, client computing device 14, and other devices in system 10. For instance, server system 16 may receive context data that indicate geographical position information of client computing device 12 and other devices, vibrations detected by client computing device 12 and the other devices, names and signal strengths of wireless access points detected by client computing device 12 and the other devices, and so on. In this example, server system 16 may use one or more aspects to identify devices that are in the same general vicinity as client computing device 12. For instance, server system 16 may use geographical position information to identify devices that are within a certain distance of client computing device 12. However, geographical position information may not be sufficient to identify the devices that are sufficiently close to client computing device 12, especially if client computing device 12 is indoors.

Hence, server system 16 may calculate distance and confidence scores for each of the devices identified as being within the same general vicinity as client computing device 12. The distance scores may be an estimate of the relative distance between a given device and client computing device 12. The confidence scores may indicate the confidence of server system 16 in each of the distance scores. Server system 16 may calculate the distance and confidence scores by comparing context data that indicate the same aspect of the physical environment. For example, the context data may indicate identifiers and signal strengths of wireless access points detected by client computing device 12 and another given device. In this example, server system 16 may use a Wi-Fi positioning algorithm that compares the identifiers and signal strengths to determine the relative locations of client computing device 12 and the given device. Server system 16 may use one of the multiple Wi-Fi positioning algorithms known in the art. In another example, the context data may indicate sounds detected at particular times by client computing device 12 and the given device. In this example, server system 16 may use an algorithm that generates distance and confidence scores based on comparisons of the detected sounds. In this example, server system 16 may use the Waveprint algorithm described by Michele Covell and Shumeet Baluja to generate distance and confidence scores. In another example, the context data may indicate vibration patterns detected at particular times by client computing device 12 and the given device. Nearby devices are likely to detect similar vibration patterns. In this example, server system 16 may use an algorithm that compares the detected vibration patterns. Server system 16 may then assign a distance score and a confidence score based on the similarity between the detected vibration patterns. Server system 16 may perform multiple comparisons like these in order to generate the multiple distance and confidence scores for the given device.

After server system 16 has generated the distance and confidence scores for the given device, server system 16 may use the distance and confidence scores to determine whether the given device is sufficiently close to client computing device 12. In various examples, server system 16 may use the distance and confidence scores to determine whether the given device is sufficiently close to client computing device 12 in various ways. For example, server system 16 may provide the distance and confidence scores to a machine-learning algorithm. In this example, the machine-learning algorithm may solve a mixture of experts problem. Server system 16 may determine whether the given device is sufficiently close based on an output of the machine-learning algorithm. For example, the machine-learning algorithm may output a combined score. In this example, server system 16 may compare the combined score to a threshold. If the combined score exceeds the threshold, server system 16 may determine that the given device is sufficiently close. In some examples, the threshold can be manually adapted or adapted by the machine-learning algorithm. In some instances, the machine-learning algorithm may use a hierarchical Bayesian network. In alternate examples, client computing device 12 may receive the context data and identify the proximate devices.

After identifying the devices that are currently proximate to client computing device 12, server system 16 may use data in sharing database 210 to generate shared data (360). The shared data may indicate resources shared by users of the devices that are currently proximate to client computing device 12. For example, the shared data may include URIs of the resources shared by users of the proximate devices. In addition, the shared data may include metadata regarding the resources shared by the users of the proximate devices. The metadata may include titles, thumbnails, resource type information, author information, creation and editing time information, version information, and other types of data about the resource. In some instances, the shared data may include copies of one or more of the shared resources. After generating the shared data, server system 16 may send the shared data to client computing device 12 in response to the request for the shared data (362).

Furthermore, during performing of operation 350, server system 16 may determine whether server system 16 has received a sharing notification from a client device, such as client computing device 12 (364). The sharing notification may indicate that user 20 is sharing a resource. In some instances, the sharing notification may indicate sharing preferences for the resource.

If server system 16 has received a sharing notification ("YES" of 364), server system 16 may update sharing database 210 to indicate that a user indicated by the sharing notification is sharing a resource indicated by the sharing notification (366). In various examples, server system 16 may update sharing database 210 in various ways. For example, sharing database 210 may comprise a relational database. In this example, server system 16 may add one or more records to the relational database. The additional records may indicate that the user is currently sharing the resource.

In various examples, server system 16 may store various data in sharing database 210 in response to receiving the sharing notification. For example, server system 16 may store data indicating a URI of the resource. In another example, server system 16 may store metadata regarding the resource, such as a title or a thumbnail of the resource. In some examples, the sharing notification may include a copy of the resource. For instance, if the resource is a digital photograph, the sharing notification may include a copy of the digital photograph. In such examples, server system 16 may store the copy of the resource in the sharing database 210.

Furthermore, server system 16 may determine whether server system 16 has received an unsharing notification (368). The unsharing notification may indicate that a user is no longer sharing a given resource. If server system 16 has received an unsharing notification ("YES" of 368), server system 16 may update sharing database 210 to indicate that the user is no longer sharing the given resource (370).

In addition, server system 16 may determine whether server system 16 has received a confirmation request (372). The confirmation request may indicate that a given user wants to preview and/or capture a given resource, but the given person may only preview and/or capture the given resource with the permission of the person sharing the given resource. If server system 16 receives the confirmation request ("YES" of 374), server system 16 may send a corresponding confirmation request to the client device of the user who is sharing the given resource (374).

During performance of the operation 350, server system 16 may also determine whether server system 16 has received a confirmation response (376). The confirmation response may indicate whether a person who is sharing a given resource has granted another user permission to preview and/or capture the given resource. If server system 16 has received a confirmation response ("YES" of 376), server system 16 may send a confirmation response to the client device of the other user (378). The confirmation response may indicate to the client device of the other user whether the other user is able to preview and/or capture the given resource.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer-readable medium, such as a computer-readable storage medium, containing instructions. Instructions embedded or encoded in a computer-readable medium, including a computer-readable storage medium, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media.

Various embodiments of the invention have been described. These and other embodiments are within the scope of the following claims.

What is claimed is:

1. A method comprising:
    receiving, by a first computing device, shared data that identifies a first resource, the first resource being currently shared by a second computing device;
    outputting, by the first computing device for display at a display device, a user interface comprising a private area and a public area, the public area including a first display element and a second display element, the first display element representing the first resource, the second display element representing a second resource, the second resource being shared by the second computing device or another computing device;
    receiving, by the first computing device, an input to move the first display element from the public area to the private area;
    identifying, by the first computing device and based on the shared data, an action as being associated with the first resource;
    in response to receiving the input to move the first display element from the public area to the private area, performing, by the first computing device, the action identified as being associated with the first resource;
    receiving, by the first computing device, an input to move the second display element from the public area to the private area;
    identifying, by the first computing device, an action as being associated with the second resource; and
    in response to receiving the input to move the second display element from the public area to the private area, performing, by the first computing device, the action identified as being associated with the second resource, the action identified as being associated with the second resource being different than the action identified as being associated with the first resource.

2. The method of claim 1,
    wherein the method further comprises:
    displaying, by the first computing device, a third display element in the private area of the user interface, the third display element associated with a third resource;
    receiving, by the first computing device, an input to move the third display element from the private area to the public area; and
    in response to receiving the input to move the third display element from the private area to the public area, indicating, by the first computing device, to a server system that the first computing device is sharing the third resource.

3. The method of claim 2, further comprising:
    in response to receiving the input to move the third display element from the private area to the public area, displaying, by the first computing device, the third display element in the public area;
    receiving, by the first computing device, an input to move the third display element from the public area back to the private area; and
    in response to receiving the input to move the third display element from the public area back to the private area, indicating, by the first computing device, to the server system that the first computing device is no longer sharing the third resource.

4. The method of claim 2, further comprising receiving, by the first computing device, an indication of a characteristic of people who are allowed to capture the third resource.

5. The method of claim 2, further comprising after receiving the input to move the third display element from the private area to the public area, outputting, by the first computing device and for display at the display device, a confirmation dialog, the confirmation dialog containing a prompt to indicate whether users of devices that are currently proximate to the first computing device are allowed to capture the third resource.

6. The method of claim 1, further comprising:
    displaying, by the first computing device and based on a proximity of the second computing device and the first computing device, the first display element in the public area of the user interface.

7. The method of claim 1,
    wherein the first resource is a social networking profile of the user of the second device; and
    wherein performing the action identified as being associated with the first resource comprises establishing, by the first computing device, a social networking link between a user of the first computing device and a user of the second computing device.

8. The method of claim 1,
further comprising sending, by the first computing device, context data from the first computing device to a server system, the context data indicative of one or more aspects of a physical environment of the first computing device; and
wherein receiving the shared data comprises receiving, by the first computing device, the shared data from the server system.

9. The method of claim 1,
wherein identifying an action as being associated with the first resource comprises identifying, by the first computing device, a first application as being associated with the first resource;
wherein identifying an action as being associated with the second resource comprises identifying, by the first computing device, a second application as being associated with the second resource, the second application being different than the first application;
wherein performing the action identified as being associated with the first resource comprises invoking, by the first computing device, the first application; and
wherein performing the action identified as being associated with the second resource comprises invoking, by the first computing device, the second application.

10. The method of claim 1, wherein the first display element comprises a label of the first resource and a graphical image indicative of a type of the first resource.

11. The method of claim 1, further comprising prior to receiving the input to move the first display element from the public area to the private area, receiving, the first computing device, an input to view information about the first resource while the first display element remains in the public area.

12. The method of claim 1, further comprising updating, by the first computing device, the user interface to remove the first display element from the public area based on a proximity of the second computing device and the first computing device.

13. The method of claim 1,
wherein the shared data comprises a uniform resource identifier (URI) of the first resource; and
wherein performing the action identified as being associated with the first resource comprises sending, by the first computing device, a Hypertext Transfer Protocol (HTTP) request for the URI.

14. The method of claim 1, wherein prior to performing the action identified as being associated with the first resource, the first computing device does not store contact information regarding a user of the second computing device or the second computing device.

15. The method of claim 1,
wherein the method further comprises receiving, by the first computing device, computer-readable instructions associated with the first resource; and
wherein performing the action identified as being associated with the first resource comprises performing, by the first computing device, the computer-readable instructions in response to receiving the input to move the first display element from the public area to the private area.

16. A computing device comprising a processing system configured to read instructions from a computer readable medium and execute the instructions, execution of the instructions causing the computing device to:
output, for display at a display device, a user interface that comprises a private area and a public area, the public area including a first display element and a second display element, the first display element representing a first resource, the second display element representing a second resource, the first resource being shared by a first device, the second resource being shared by the first device or a second device;
identify, based on a uniform resource identifier (URI) of the first resource, an action as being associated with the first resource;
perform, in response to receiving input to move the first display element from the public area to the private area, the action identified as being associated with the first resource;
identify, based on a URI of the second resource, an action as being associated with the second resource; and
perform, in response to receiving input to move the second display element from the public area to the private area, the action identified as being associated with the second resource, the action identified as being associated with the first resource being different than the action identified as being associated with the second resource.

17. A computer-readable storage medium comprising instructions for causing one or more processors of a computing device to perform operations comprising:
receiving shared data from a server system, the shared data identifying a first resource and a second resource shared by devices;
outputting, for display at a display device, a user interface that comprises a public area and a private area, the public area including a first display element and a second display element, the first display element representing the first resource, the second display element representing the second resource;
receiving input to move the first display element from the public area to the private area;
identifying, based on the shared data, an action associated with the first resource;
in response to receiving the input to move the first display element from the public area to the private area, performing the action associated with the first resource;
receiving input to move the second display element from the public area to the private area;
identifying, based on the shared data, an action associated with the second resource, the action associated with the second resource being different than the action associated with the first resource; and
in response to receiving the input to move the second display element from the public area to the private area, performing the action associated with the second resource.

18. The computer-readable storage medium of claim 17, wherein performing the action associated with the first resource comprises launching a first application and performing the action associated with the second resource comprises launching a second application, the first application being different than the second application.

* * * * *